United States Patent [19]

Sunagawa et al.

[11] Patent Number: 4,868,803
[45] Date of Patent: Sep. 19, 1989

[54] MAGNETO-OPTIC PICKUP HEAD INCLUDING TRACKING AND FOCUSING ERROR CORRECTION

[75] Inventors: Hiroshi Sunagawa, Kanagawa; Toshiaki Suhara; Hiroshi Nishihara, both of Ohsaka, all of Japan

[73] Assignee: Fuji Photo Film Co., Ltd., Kanagawa, Japan

[21] Appl. No.: 183,878

[22] Filed: Apr. 20, 1988

[30] Foreign Application Priority Data

Apr. 20, 1987 [JP] Japan .................................. 62-96718
Apr. 20, 1987 [JP] Japan .................................. 62-96719

[51] Int. Cl.$^4$ .............................................. G11B 7/00
[52] U.S. Cl. ...................................... 369/44; 369/45; 369/13; 360/114
[58] Field of Search ................... 358/342; 369/43–47, 369/13; 250/201 DF; 360/114

[56] References Cited

U.S. PATENT DOCUMENTS 3,877,784  4/1975  Lin .................................. 350/96 WG
4,626,679  12/1986  Kuwayama et al. ............. 369/44 X
4,758,062  7/1988  Sunagawa et al. ............... 350/96.19

*Primary Examiner*—Robert L. Richardson
*Attorney, Agent, or Firm*—Sughrue, Mion, Zinn, Macpeak & Seas

[57] ABSTRACT

A pickup apparatus for a magneto-optical recording medium comprises the first and second waveguides lying one upon the other for receiving a light beam reflected by a magneto-optical recording medium, and first and second focusing grating couplers disposed on the first waveguide for introducing the reflected light beam into the first waveguide in the same guided mode. A third focusing grating coupler is disposed for introducing the reflected light beam into the second waveguide in a different guided mode. First, second and third photodetectors are secured to the first or second waveguide for detecting the optical waves converged by the first, second and third focusing grating couplers. Tracking error and focusing error are detected based on the outputs of the first and second photodetectors, and recorded signals are detected based on a difference between the output of the first and/or second photodetector and an output of the third photodetector.

22 Claims, 13 Drawing Sheets

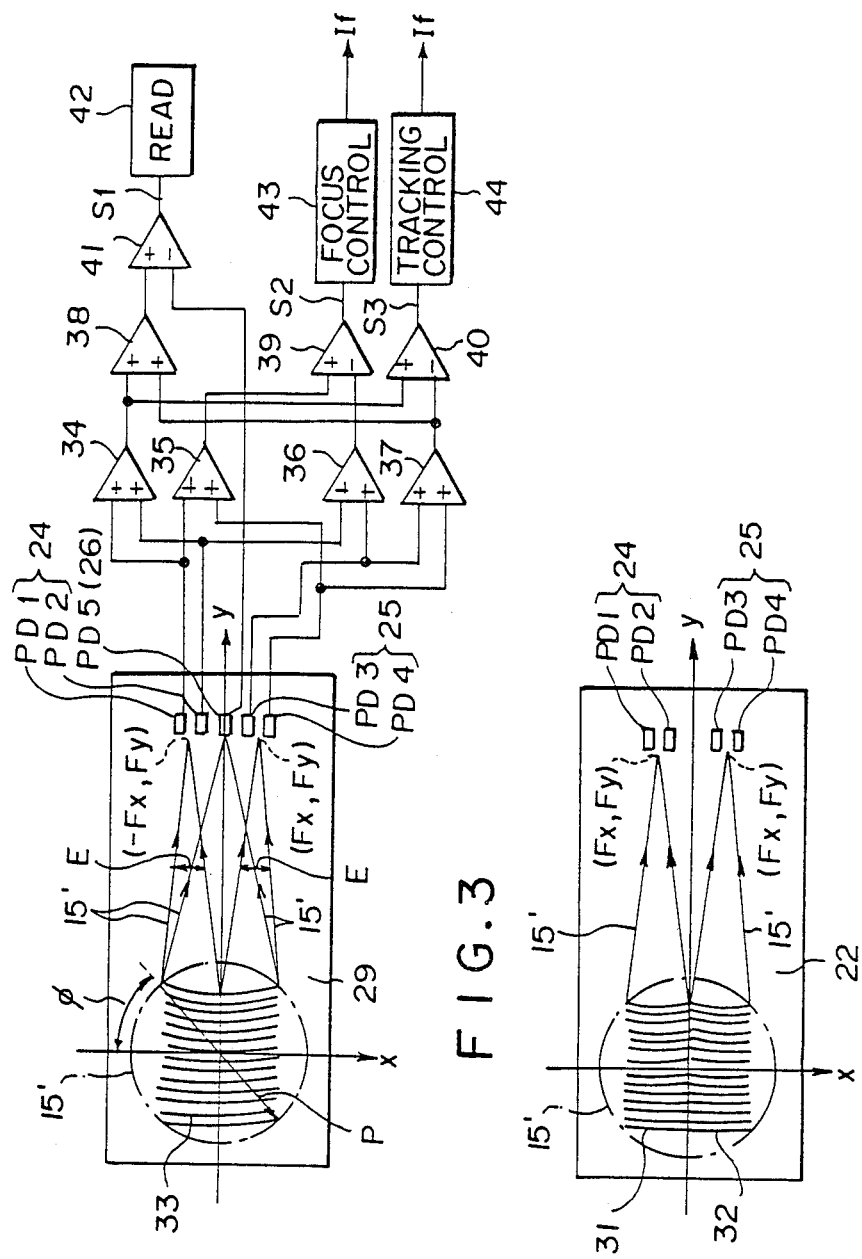

F I G. 22
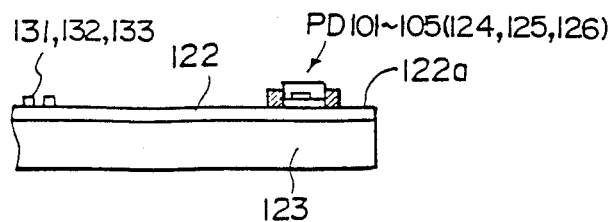
F I G. 23
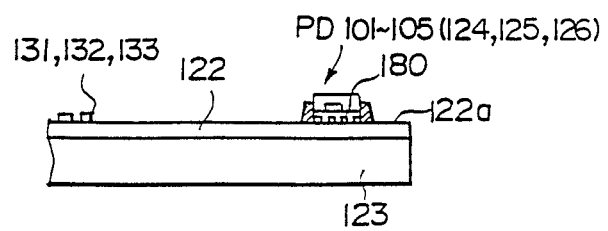
F I G. 24
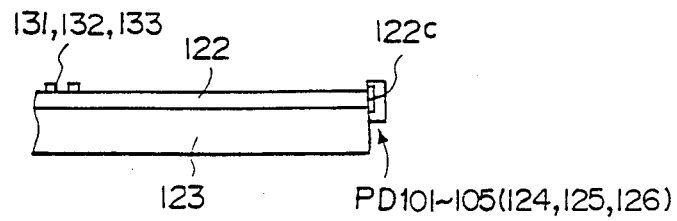
F I G. 25
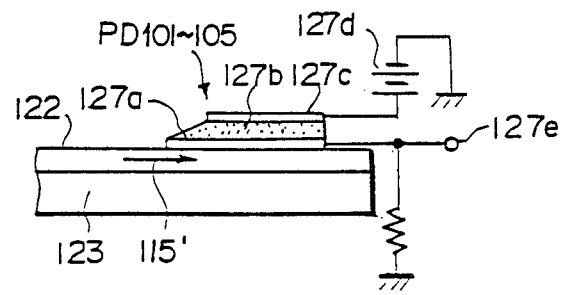

MAGNETO-OPTIC PICKUP HEAD INCLUDING TRACKING AND FOCUSING ERROR CORRECTION

BACKGROUND OF THE INVENTION

1. Field of the Invention

This invention relates to a pickup apparatus for detecting (reading out) signals recorded on a magneto-optical recording medium such as a magneto-optical disk. This invention particularly relates to a pickup apparatus using an optical waveguide.

2. Description of the Prior Art

In recent years, magneto-optical recording media such as magneto-optical disks are widely used as recording media for image signals, audio signals or the like. Signals recorded on the magneto-optical recording medium in terms of directions of magnetization are detected by use of an optical pickup apparatus. The optical pickup apparatus is constituted to irradiate, for example, linearly polarized light such as a laser beam to the surface of the magneto-optical recording medium, and to detect the directions of magnetization on the magneto-optical recording medium by utilization of the magnetic Kerr effects with which the plane of polarization of the light reflected by the magneto-optical recording medium is rotated in accordance with the direction of magnetization.

Specifically, with the pickup apparatus for the magneto-optical recording medium, the light reflected by the magneto-optical recording medium is detected by a photodetector via an analyzer, and the directions of magnetization, i.e. the recorded signals, are detected by utilizing such effects that the detected optical amounts change in accordance with the rotation of the plane of polarization of the reflected light. Besides the function of carrying out detection of the recorded signals as mentioned above, the pickup apparatus is required to have the function of detecting tracking error, i.e. the function of detecting whether the light beam for the detection of the condition of magnetization is deviated rightward or leftward from the center of a track along a predetermined groove, and the function of detecting focusing error, i.e. the function of detecting whether the focusing point of the light beam is deviated forward or backward from the reflection surface of the magneto-optical recording medium. A signal representing the tracking error or the focusing error is utilized to control tracking or focusing so that the signal is canceled, thereby to irradiate the light beam accurately to the predetermined track or to focus the light beam accurately onto the reflection surface of the magneto-optical recording medium. As the method of detecting a tracking error, there have heretofore been known the push-pull technique, the heterodyning technique, temporal (time difference) detection technique and other such techniques. On the other hand, as the method of detecting a focusing error, there have heretofore been known the astigmatism technique, the critical angle detection technique, the Foucault technique and other such techniques.

In order to provide the aforesaid functions together with the signal detecting function, the conventional pickup apparatus for a magneto-optical recording medium is composed of small optical elements such as a beam splitter for splitting a light beam reflected by a magneto-optical recording medium from the light beam irradiated onto the magneto-optical recording medium, a lens for converging the reflected light beam in the vicinity of a photodetector such as a photodiode, the aforesaid analyzer, and a prism for carrying out the tracking error detecting method and the focusing error detecting method.

However, the aforesaid small optical elements require accurate machining or processing, and troublesome adjustment of positions of the small optical elements with respect to each other must be carried out at the time of assembling the pickup apparatus. Therefore, the pickup apparatus using such optical elements naturally becomes expensive. Also, the pickup apparatus having the configuration as mentioned above is large and heavy, and therefore is disadvantageous from the viewpoint of making the read-out apparatus small and light and shortening the access time. Particularly, in the case where differential detection for improvement of the S/N ratio of the read-out signals is carried out, a semi-transparent mirror or the like is necessary for splitting the reflected light beam into two beams, and some optical systems for the differential detection require two analyzers. Therefore, it this case, the pickup apparatus becomes more complicated, larger and heavier.

Accordingly, various attempts have heretofore been made to eliminate the aforesaid drawbacks of the conventional pickup apparatus by simplifying the configuration of the pickup apparatus by use of, for example, a special optical element such as an aspherical lens. However, the optical element of this type is very expensive, and therefore the cost of the pickup apparatus using such an optical element does not become much lower than the cost of the aforesaid pickup apparatus even though the configuration is simplified.

SUMMARY OF THE INVENTION

The primary object of the present invention is to provide a pickup apparatus for a magneto-optical recording medium, which is small and light.

Another object of the present invention is to provide a pickup apparatus for a magneto-optical recording medium, which is fabricated with a very low cost.

A first pickup apparatus for a magneto-optical recording medium in accordance with the present invention is constituted so that the effects of the optical elements such as a beam splitter, a lens, a prism, an analyzer and a semi-transparent mirror for carrying out differential detection in the conventional pickup apparatus are achieved by two optical waveguide elements provided with focusing grating couplers.

Specifically, the present invention provides a first pickup apparatus for a magneto-optical recording medium, which comprises:

(i) a light source for irradiating a linearly polarized light beam onto a surface of a magneto-optical recording medium, (ii) an objective lens for converging said light beam onto the reflection surface of said magneto-optical recording medium, (iii) a firt optical waveguide and a second optical waveguide combined integrally to overlap each other and disposed in such a direction that one surface of each of said first optical waveguide and said second optical waveguide receives the light beam reflected by said magneto-optical recording medium, (iv) a first focusing grating coupler and a second focusing grating coupler provided side by side at an incidence position of said reflected light beam on the surface of said first optical waveguide so that an axis passing through approximately the center of said reflected light beam and extending on said surface of said first optical waveguide approximately normal to a tracking direction intervenes between said first focusing grating coupler and said second focusing grating coupler, so that said first focusing grating coupler and said second focusing grating coupler respectively make said reflected light beam enter said first optical waveguide by exciting either one of a TE guided mode and a TM guided mode, and respectively converge the optical waves, which are thus guided through said first optical waveguide in the guided modes identical with each other, to positions spaced from each other with said axis intervening therebetween, (v) a third focusing grating coupler provided in overlapping relation to said first focusing grating coupler and said second focusing grating coupler at the incidence position of said reflected light beam on the surface of said second optical waveguide, so that said third focusing grating coupler makes said reflected light beam enter said second optical waveguide by exciting a guided mode different from said guided modes of said first focusing grating coupler and said second focusing grating coupler (i.e. by exciting the TM guided mode in the case where the first focusing grating coupler and the second focusing grating coupler excite the TE guided mode), and converges the optical wave, which is thus guided through said second optical waveguide, (vi) a first photodetector, a second photodetector, and a third photodetector mounted on the surface or an edge face of said first optical waveguide or said second optical waveguide for respectively detecting the optical wave converged by said first focusing grating coupler, the optical wave converged by said second focusing grating coupler, and the optical wave converged by said third focusing grating coupler, (vii) an error detection circuit for carrying out detection of tracking error and detection of focusing error on the basis of outputs of said first photodetector and said second photodetector, and (viii) a differential detection circuit for detecting signals recorded on said magneto-optical recording medium on the basis of a difference between the output of said first photodetector and/or the output of said second photodetector on one hand and a output of said third photodetector on the other hand.

Each of the first, second and third focusing grating couplers is a diffraction grating having a curvature or a curvature and "chirp". The focusing grating coupler directly couples the wave surface outside of the optical waveguide with the wave surface of the optical wave guided inside of the optical waveguide, and converges the guided optical wave in the optical waveguide.

Second and third pickup apparatuses for a magneto-optical recording medium in accordance with the present invention are constituted so that the effects of the optical elements such as a objective lens for converging a light beam emitted by a light source onto a reflection surface of a magneto-optical recording medium, a beam splitter, a converging lens, a prism, an analyzer and a semi-transparent mirror for carrying out differential detection in the conventional pickup apparatus are achieved by optical waveguide elements provided with focusing grating couplers.

Specifically, the present invention also provides a second pickup apparatus for a magneto-optical recording medium, which comprises:

(i) a first optical waveguide, (ii) a light source mounted on said first optical waveguide for emitting a linearly polarized light beam into said first optical waveguide, (iii) a first focusing grating coupler formed on a surface of said first optical waveguide for radiating the optical wave, which is thus guided through said first optical waveguide, out of said first optical waveguide, and converging said radiated optical wave on a reflection surface of a magneto-optical recording medium, (iv) a second optical waveguide combined integrally with said first optical waveguide and disposed in such a direction that one surface of said second optical waveguide receives the optical wave reflected by said magneto-optical recording medium, (v) a second focusing grating coupler and a third focusing grating coupler provided side by side at an incidence position of said reflected optical wave on the surface of said second optical waveguide so that an axis passing through approximately the center of said reflected optical wave and extending on said surface of said second optical waveguide approximately normal to a tracking direction intervenes between said second focusing grating coupler and said third focusing grating coupler, so that said second focusing grating coupler and said third focusing grating coupler respectively make said reflected optical wave enter said second optical waveguide by exciting either one of a TE guided mode and a TM guided mode, and respectively converge the optical waves, which are thus guided through said second optical waveguide in the guided modes identical with each other, to positions spaced from each other with said axis intervening therebetween, (vi) a fourth focusing grating coupler provided side by side with said second focusing grating coupler and said third focusing grating coupler at the incidence position of said reflected optical wave on the surface of said second optical waveguide, so that said fourth focusing grating coupler makes said reflected optical wave enter said second optical waveguide by exciting a guided mode different from said guided modes of said second focusing grating coupler and said third focusing grating coupler (i.e. by exciting the TM guided mode in the case where the second focusing grating coupler and the third focusing grating coupler excite the TE guided mode), and converges the optical wave, which is thus guided through said second optical waveguide, in said second optical waveguide, (vii) a first photodetector, a second photodetector, and a third photodetector mounted on the surface or an edge face of said second optical waveguide for respectively detecting the optical wave converged by said second focusing grating coupler, the optical wave converged by said third focusing grating coupler, and the optical wave converged by said fourth focusing grating coupler, (viii) an error detection circuit for carrying out detection of tracking error and detection of focusing error on the basis of outputs of said first photodetector and said second photodetector, and
(ix) a differential detection circuit for detecting signals recorded on said magneto-optical recording medium on the basis of a difference between the output of said first photodetector and/or the output of said second photodetector on one hand and an output of said third photodetector on the other hand.

In a third pickup apparatus for a magneto-optical recording medium in accordance with the present invention, the fourth focusing grating coupler which provided side by side with the second focusing grating coupler and the third focusing grating coupler on the second optical waveguide in the aforesaid second pickup apparatus for a magneto-optical recording medium in accordance with the present invention is provided on a different optical waveguide.

Specifically, the present invention further provides a third pickup apparatus for a magneto-optical recording medium, wherein:
  the first optical waveguide and the second optical waveguide as defined above for the second pickup apparatus for a magneto-optical recording medium in accordance with the present invention are provided,
  a third optical waveguide is provided in overlapping relation to said second optical waveguide,
  the fourth focusing grating coupler as defined above for said second pickup apparatus is formed on the surface of said third optical waveguide in overlapping relation to the second focusing grating coupler and the third focusing grating coupler on said second optical waveguide, and
  said first photodetector, said second photodetector, and said third photodetector are mounted on the surface or an edge face of said second optical waveguide or said third optical waveguide.

With the configuration of the third pickup apparatus for a magneto-optical recording medium in accordance with the present invention, the reflected optical wave passing through the fourth focusing grating coupler (or passing through the second focusing grating coupler and the third focusing grating coupler) is taken into the third optical waveguide by the second focusing grating coupler and the third focusing grating coupler (or by the fourth focusing grating coupler), and is converged.

In the second and third pickup apparatuses for a magneto-optical recording medium in accordance with the present invention, each of the first, second, third and fourth focusing grating couplers is a diffraction grating having a curvature or a curvature and "chirp". The focusing grating coupler directly couples the wave surface outside of the optical waveguide with the wave surface of the optical wave guided inside of the optical waveguide, and converges the reflected optical wave, which is radiated out of the optical waveguide, at a position outward from the optical waveguide, or converges the reflected optical wave in the optical waveguide.

With the first pickup apparatus for magneto-optical recording medium in accordance with the present invention, the effects of the optical elements such as a beam splitter, a lens, a prism, an analyzer and a semi-transparent mirror for carrying out differential detection in the conventional pickup apparatus are achieved by the focusing grating couplers formed on the optical waveguides. Therefore, the first pickup apparatus for a magneto-optical recording medium in accordance with the present invention can be fabricated small and light with a very small number of parts. Accordingly, the cost of the apparatus becomes markedly lower and the access time can be shortened as compared with the conventional pickup apparatus.

Also, the major part of the first pickup apparatus for a magneto-optical recording medium in accordance with the present invention can be readily mass-produced by a planar technique. This feature also contributes to reduction in the cost of the apparatus.

The first pickup apparatus for a magneto-optical recording medium in accordance with the present invention is free from adjustment of positions of the optical elements as in the conventional pickup apparatus. Also, with the first pickup apparatus for a magneto-optical recording medium in accordance with the present invention wherein the photodetectors are coupled with the optical waveguide, it is not necessary to carry out adjustment of the positions of the photodetectors with respect to the optical elements. These features also contribute to reduction in the cost of the apparatus.

Also, with the first pickup apparatus for a magneto-optical recording medium in accordance with the present invention wherein the first focusing grating coupler and the second focusing grating coupler on one hand and the third focusing grating coupler on the other hand are disposed in overlapping relation to each other, the light utilization efficiency can be improved and the energy requirement can be minimized.

With the second and third pickup apparatuses for a magneto-optical recording medium in accordance with the present invention, the effects of the optical elements such as an objective lens, a beam splitter, a converging lens, a prism, an analyzer and a semi-transparent mirror for carrying out differential detection in the conventional pickup apparatus are achieved by the focusing grating couplers formed on the optical waveguides. Therefore, the second and third pickup apparatuses for a magneto-optical recording medium in accordance with the present invention can be fabricated small and light with a very small number of parts. Accordingly, the costs of the apparatuses become markedly lower and the access time can be shortened as compared with the conventional pickup apparatus.

Also, the major part of each of the second and third pickup apparatuses for a magneto-optical recording medium in accordance with the present invention can be readily mass-produced by a planar technique. This feature also contributes to reduction in the cost of the apparatus.

The second and third pickup apparatuses for a magneto-optical recording medium in accordance with the present invention is free from adjustment of positions of the optical elements as in the conventional pickup apparatus. Also, with the second and third pickup apparatuses for a magneto-optical recording medium in accordance with the present invention wherein the photodetectors are coupled with the optical waveguide, it is not necessary to carry out adjustment of the positions of the photodetectors with respect to he optical elements. These features also contribute to reduction in the cost of the apparatus.

Also, with the second and third pickup apparatuses for a magneto-optical recording medium in accordance with the present invention wherein the first optical waveguide and the second optical waveguide combined integrally are moved in the course of carrying out the tracking control and the focusing control, the relationship between the position of the first focusing grating coupler for radiation of the optical wave on one hand and the positions of the second focusing grating coupler and the third focusing grating coupler for receiving the reflected optical wave on the other hand does not change even though the tracking control and the focusing control are carried out. Therefore, the second and third pickup apparatuses in accordance with the present invention are free from the problem that the optical amount of the reflected light beam detected fluctuates in accordance with the inclination of the objective lens, thereby to cause noise in the read-out signals detected from the recorded information, or a tracking error is caused by offset of the objective lens, as in the case of the conventional apparatus wherein the objective lens is moved for the purposes of the tracking control and the focusing control. Also, the elements on the light beam source side and the elements on the reflected optical wave receiving side are constituted by the optical waveguide elements which are light. Therefore, even though the elements on the light beam source side and the elements on the reflected optical wave receiving side are moved together, the control response characteristics can be maintained high.

Particularly, with the third pickup apparatus for a magneto-optical recording medium in accordance with the present invention wherein the second focusing grating coupler and the third focusing grating coupler on one hand and the fourth focusing grating coupler on the other hand are disposed in overlapping relation to each other, the light utilization efficiency can be improved and the energy requirement can be minimized.

With the first pickup apparatus for a magneto-optical recording medium in accordance with the present invention, the light beam reflected by the magneto-optical recording medium is introduced by the focusing grating couplers into the optical waveguides, and is thus separated from the optical path of the light beam advancing from the light source toward the magneto-optical recording medium. This effect is the same as the effect of the beam splitter in the conventional pickup apparatus. Also, the focusing grating couplers converge the guided optical waves (reflected light beam) in the optical waveguides. The converging effect of the focusing grating couplers is the same as the effect of the lens in the conventional pickup apparatus. Further, since the first focusing grating coupler and the second focusing grating coupler are disposed at the positions as mentioned above, the light beam reflected by the magneto-optical recording medium and incident upon the focusing grating couplers is separated into two guided optical waves in the tracking direction and converged onto two spots. This effect is the same as the effect of the prism in the conventional pickup apparatus.

Also, the first focusing grating coupler and the second focusing grating coupler are formed to excite the TE guided mode or the TM guided mode, and the third focusing grating coupler is formed to excite the TM guided mode in the case where the first focusing grating coupler and the second focusing grating coupler excite the TE guided mode, or to excite the TE guided mode in the case where the first focusing grating coupler and the second focusing grating coupler excite the TM guided mode. As a result, the output of the first photodetector and/or the second photodetector and the output of the third photodetector change complementarily in accordance with the direction of polarization of the reflected light beam. Therefore, the direction of polarization of the reflected light beam, i.e. the signal recorded on the magneto-optical recording medium can be detected by detecting the difference between the two outputs by use of the differential detection circuit. In this manner, read-out signals of a high S/N ratio can be obtained as in the case where differential detection is carried out by use of the differential detection optical system. Specifically, as the third focusing grating coupler is provided together with the first focusing grating coupler and the second focusing grating coupler, the beam splitting effect can be obtained in the same manner as the semi-transparent mirror. Also, since guided modes which the respective focusing grating couplers excite are adjusted in the manner as mentioned above, the same effects as those of the two analyzers can be obtained.

It may be considered to dispose the first focusing grating coupler, the second focusing grating coupler and the third focusing grating coupler side by side on a single optical waveguide. However, the S-polarized light components (or the P-polarized light components) of the reflected light beam which is caused by the first focusing grating coupler and the second focusing grating coupler to couple with the optical wave guided in the TE guided mode (or in the TM guided mode) cannot be introduced into the optical waveguide by the third focusing grating coupler. In this case, of the S-polarized light components (or the P-polarized light components) of the reflected light beam, the part that is irradiated to the third focusing grating coupler cannot be utilized for the signal read-out. The reverse also arises. However, with the first pickup apparatus for a magneto-optical recording medium in accordance with the present invention wherein the first focusing grating coupler and the second focusing grating coupler on one hand and the third focusing grating coupler on the other hand are provided in overlapping relation to each other, the polarized light component of the reflected light beam that is not introduced into the first optical waveguide (or the second optical waveguide) by the first focusing grating coupler and the second focusing grating coupler (or by the third focusing grating coupler) can pass through the first focusing grating coupler and the second focusing grating coupler (or the third focusing grating coupler) and can be introduced into the second optical waveguide (or the first optical waveguide) by the third focusing grating coupler (or by the first focusing grating coupler and the second focusing grating coupler). Therefore, the efficiency of detection of the reflected light beam and the light utilization efficiency can be improved.

With the second and third pickup apparatuses for a magneto-optical recording medium in accordance with the present invention, the optical wave impinging upon the magneto-optical recording medium is converted on the reflection surface of the magneto-optical recording medium by the first focusing grating coupler provided on the first optical waveguide. In this manner, the effect of the aforesaid objective lens is achieved. On the other hand, the optical wave reflected by the magneto-optical recording medium is introduced by the second focusing grating coupler, the third focusing grating coupler, and the fourth focusing grating coupler into the second optical waveguide or the third optical waveguide, whereby the optical path of the reflected optical wave is bent and the reflected optical wave is guided to the photodetectors. This effect is the same as the effect of the beam splitter in the conventional pickup apparatus. Also, the second focusing grating coupler, the third focusing grating coupler, and the fourth focusing grating coupler converge the guided optical waves in the second optical waveguide or third optical waveguide. The converging effect of the focusing grating couplers is the same as the effect of the converging lens in the conventional pickup apparatus. Further, since the second focusing grating coupler and the third focusing grating coupler are disposed at the positions as mentioned above, the optical wave reflected by the magneto-optical recording medium and incident upon the focusing grating couplers is separated into two guided optical waves in the tracking direction and converged onto two spots. This effect is the same as the effect of the prism in the conventional pickup apparatus.

Also, the second focusing grating coupler and the third focusing grating coupler are formed to excite the TE guided mode or the TM guided mode, and the fourth focusing grating coupler is formed to excite the TM guided mode in the case where the second focusing grating coupler and the third focusing grating coupler excite the TE guided mode, or to excite the TE guided mode in the case where the second focusing grating coupler and the third focusing grating coupler excite the TM guided mode. As a result, the output of the first photodetector and/or the second photodetector and the output of the third photodetector change complementarily in accordance with the direction of polarization of the reflected optical wave. Therefore, the direction of polarization of the reflected optical wave, i.e. the signal recorded on the magneto-optical recording medium can be detected by detecting the difference between the two outputs by use of the differential detection circuit. In this manner, read-out signals of a high S/N ratio can be obtained as in the case where differential detection is carried out by use of the differential detection optical system. Specifically, as the fourth focusing grating coupler is provided as well as the second focusing grating coupler and the third focusing grating coupler, the beam splitting effect can be obtained in the same manner as the semi-transparent mirror. Also, since guided modes which the respective focusing grating couplers excite are adjusted in the manner as mentioned above, the same effects as those of the two analyzers can be obtained.

Also, with the configurations of the second and third pickup apparatuses for a magneto-optical recording medium in accordance with the present invention wherein the first optical waveguide and the second optical waveguide (as well as the third optical waveguide in the third pickup apparatus) are combined integrally, the relationship of the positions of the second focusing grating coupler, the third focusing grating coupler, and the fourth focusing grating coupler with respect to the position of the first focusing grating coupler is maintained constant even though the tracking control is carried out. Therefore, it is possible to prevent the problem that the optical amount of the reflected light beam detected fluctuates in accordance with the inclination of the objective lens, thereby to cause noise in the read-out signals detected from the recorded information, or a tracking error is caused by offset of the objective lens, as in the case of the conventional apparatus wherein the objective lens is moved for the purpose of the tracking control.

In order to simplify the configuration and to facilitate fabrication, the second focusing grating coupler, the third focusing grating coupler and the fourth focusing grating coupler should preferably be provided on a single optical waveguide (i.e. the second optical waveguide) as in the second pickup apparatus in accordance with the present invention. However, in this case, the S-polarized light components (or the P-polarized light components) of the reflected optical wave which is caused by the second focusing grating coupler and the third focusing grating coupler to couple with the optical wave guided in the TE guided mode (or in the TM guided mode) cannot be introduced into the optical waveguide by the fourth focusing grating coupler. Therefore, of the S-polarized light components (or the P-polarized light components) of the reflected optical wave, the part that is irradiated to the fourth focusing grating coupler cannot be utilized for the signal read-out. The reverse also arises.

Accordingly, with the third pickup apparatus for a magneto-optical recording medium in accordance with the present invention, the second focusing grating coupler and the third focusing grating coupler on one hand and the fourth focusing grating coupler on the other hand are provided in overlapping relation to each other. With this configuration, the polarized light component of the reflected optical wave that is not introduced into the second optical waveguide (or the third optical waveguide) by the second focusing grating coupler and the third focusing grating coupler (or by the fourth focusing grating coupler) can pass through the second focusing grating coupler and the third focusing grating coupler (or by the fourth focusing grating coupler) and can be introduced into the third optical waveguide (or the second optical waveguide) by the fourth focusing grating coupler (or by the second focusing grating coupler and the third focusing grating coupler). Therefore, the efficiency of detection of the reflected light beam and the light utilization efficiency can be improved as compared with the aforesaid second pickup apparatus.

BRIEF DESCRIPTION OF THE DRAWINGS

FIG. 2 is a schematic view showing the top plan shape of the optical waveguides in the embodiment shown in FIG. 1 and the electric circuit used for the embodiment, FIG. 3 is a partial plan view showing the first optical waveguide in the embodiment shown in FIG. 1, FIGS. 22, 23, 24 and 25 are side views showing further examples of the photodetectors used in the second pickup apparatus for a magneto-optical recording medium in accordance with the present invention.

DESCRIPTION OF THE PREFERRED EMBODIMENTS

The present invention will hereinbelow be described in further detail with reference to the accompanying drawings.

Figure 1:
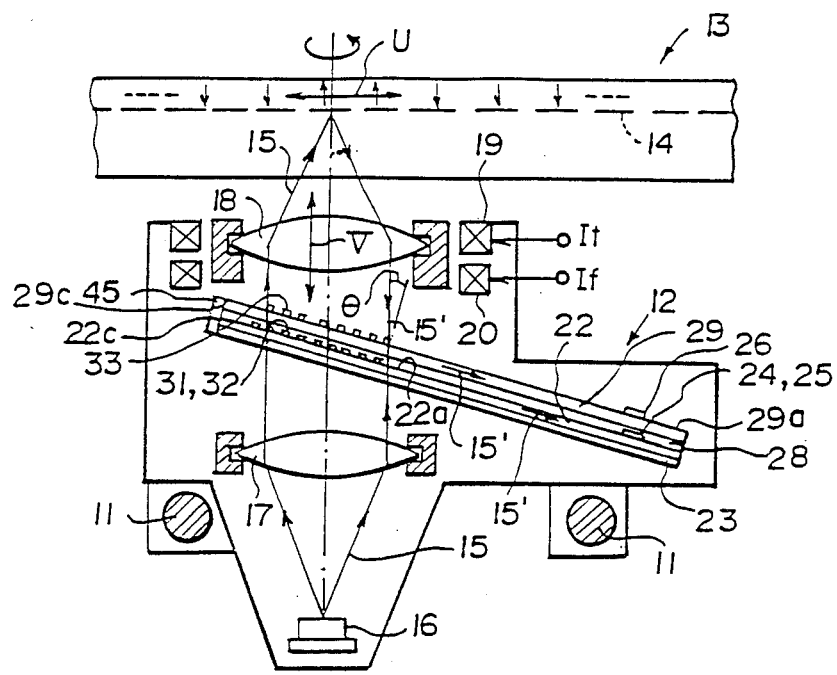
FIG. 1 is a side view showing an embodiment of the first pickup apparatus for a magneto-optical recording medium in accordance with the present invention.

FIG. 1 shows an embodiment of the first pickup apparatus for a magneto-optical recording medium in accordance with the present invention, and FIG. 2 shows the top plan view of the optical waveguides in the embodiment shown in FIG. 1 and an electric circuit used for the embodiment shown in FIG. 1. With reference to FIG. 1, the first pickup apparatus is provided with rods 11, 11 extending at an angle approximately normal to the drawing sheet in FIG. 1, and a block 12 moveable along the rods 11, 11. In order to follow along a signal string (track) along a predetermined groove, the block 12 is moved normal to or approximately normal to the direction of the track (i.e. the direction as indicated by the arrow U at the light beam incidence position) by, for example, a precision feed screw and an optical system feed motor.

The block 12 is provided with a semiconductor laser 16 for irradiating a linearly polarized light beam (a laser beam) 15 to a reflection surface 14 of a magneto-optical disk 13, a collimator lens 17 for collimating the divergent light beam 15 emitted by the semiconductor laser 16, and an objective lens 18 for converging the collimated light beam 15 onto the reflection surface 14 of the optical disk 13. For the purposes of tracking control and focusing control as will be described later, the objective lens 18 is supported moveably in a tracking direction normal to the direction as indicated by the arrow U and in a focusing direction as indicated by the arrow V, and is moved in these directions by a tracking coil 19 and a focusing coil 20.

A second optical waveguide 29 is disposed between the collimator lens 17 and the objective lens 18 in such a direction that a surface 29a of the second optical waveguide 29 receives a light beam 15' reflected by the magneto-optical disk 13. The second optical waveguide 29 is combined integrally with a first optical waveguide 22, which is formed on a transparent support 23, to lie thereupon via a buffer layer 28. The buffer layer 28 is formed of a material having a refractive index lower than the refractive indexes of the optical waveguides 22 and 29. Also, as shown in FIG. 3, a first focusing grating coupler 31 and a second focusing grating coupler 32 are disposed adjacent to one another on the surface 22a of the first optical waveguide 22 at the position upon which the reflected light beam 15' impinges. (The focusing grating coupler will hereinafter be abbreviated to FGC.) Each of the first FGC 31 and the second FGC 32 is a diffraction grating having a curvature or a curvature and "chirp". The first FGC 31 and the second FGC 32 respectively introduce the reflected light beam 15' into the first optical waveguide 22 and converge the reflected light beam 15' (optical waves 15', 15') thus guided through the first optical waveguide 22 into a single spot in the first optical waveguide 22. As shown in FIG. 2, the first FGC 31 and the second FGC 32 are disposed side by side so that a y axis on the first optical waveguide 22 normal to the aforesaid tracking direction and passing through nearly the center of the reflected light beam 15' intervenes between the FGC 31 and the FGC 32. Also, the FGC 31 and the FGC 32 are formed to converge the optical waves 15', 15' to positions spaced from each other with the y axis intervening therebetween.

On the other hand, a third FGC 33 is provided on the surface 29a of the second optical waveguide 29. Basically, the third FGC 33 is of the type similar to the first FGC 31 and the second FGC 32. The third FGC 33 has an aperture area nearly equal to the total aperture area of the first FGC 31 and the second FGC 32, and is positioned in overlapping relation to the first FGC 31 and the second FGC 32.

Also, grating pitches of the first FGC 31, the second FGC 32 and the third FGC 33 are adjusted so that the first FGC 31 and the second FGC 32 excite the TE guided mode, and the third FGC 33 excites the TM guided mode. As shown in FIG. 2, the first optical waveguide 22 and the second optical waveguide 29 are disposed so that the x axis is inclined at an angle of 45° with respect to the direction of linear polarization of the reflected light beam 15' as indicated by the arrow P. The direction of linear polarization of the reflected light beam 15' rotates in accordance with the direction of magnetization in the magneto-optical disk 13. Therefore, in this embodiment, the direction of linear polarization of the light beam 15' reflected by an un-magnetized part is taken as a reference, and it is adjusted so that the x axis makes an angle of 45° with respect to said reference direction of linear polarization. The first FGC 31 and the second FGC 32 may also be provided on the surface of the first optical waveguide 22 opposite to the surface 22a, i.e. on the lower surface thereof in FIG. 1. This also applies to the third FGC 33.

When positions on the first optical waveguide 22 are defined by the x axis, i.e. the axis in the tracking direction, and the y axis in FIG. 2 and coordinates of the optical wave converging positions by the FGC 31 and the FGC 32 are respectively expressed as $(-Fx, Fy)$ and $(Fx, Fy)$, an m'th grating pattern of each of the FGC 31 and the FGC 32 having the aforesaid effects is expressed as $$y \sin\theta + N_{TE}\sqrt{(x \mp Fx)^2 + (y - Fy)^2} = m\lambda + \text{const.}$$

(double signs: "+" for the FGC 31, "−" for the FGC 32)

where $\lambda$ denotes the optical wavelength of the reflected light beam 15', $\theta$ denotes the angle of incidence of the reflected light beam 15' upon the FGC 31 and the FGC 32, and $N_{TE}$ denotes the effective refractive index of the first optical waveguide 22 with respect to the TE mode optical wave.

On the other hand, when coordinates of the optical wave converging position by the FGC 33 are expressed as (0, Fy), an m'th grating pattern of the FGC 33 is expressed as $$y \sin\theta + N_{TM}\sqrt{x^2 + (y - Fy)^2} = m\lambda + \text{const.}$$

where $N_{TM}$ denotes the effective refractive index of the second optical waveguide 29 with respect to the TM mode optical wave, and the other factors are as defined above.

The first optical waveguide 22 may be formed by, for example, sputtering #7059 glass onto the support 23 made of pyrex glass. Also, the second optical waveguide 29 may be formed by, for example, overlaying the transparent buffer layer 28 formed of, for example, SiO$_2$ on the first optical waveguide 22, and then sputtering #7059 glass onto the buffer layer 28. On the other hand, the FGC 31, the FGC 32 and the FGC 33 may be formed by, for example, forming a Si-N film on the first optical waveguide 22 or the second optical waveguide 29 by PCVD (plasma-enhanced chemical vapor deposition), forming a resist pattern by the electron beam direct drawing method, and then transferring the pattern to the Si-N film by RIE. By way of example, in the case where the optical waveguide 22 and 29 (thickness: 0.76 μm), the FGC 31, the FGC 32 and the FGC 33 are formed of the aforesaid materials, the center period of each of the FGC 31 and the FGC 32 which excite the TE guided mode and which have the grating patterns as defined by the aforesaid pattern formulas is 0.782 μm, and the center period of the FGC 33 which excites the TM guided mode is 0.786 μm.

Figure 4:
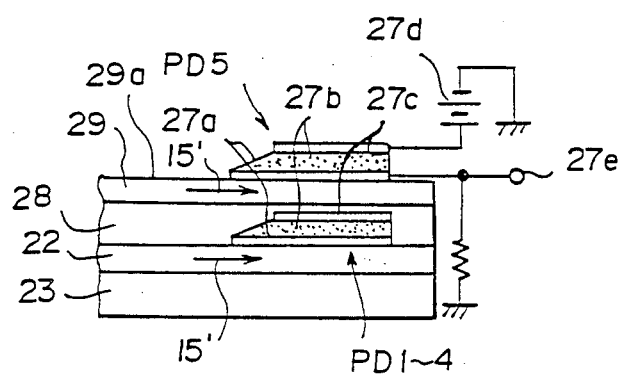
FIG. 4 is a side view showing the photodetector in the embodiment shown in FIG. 1, FIGS. 5 and 6 are side views showing further embodiments of the first pickup apparatus for a magneto-optical recording medium in accordance with the present invention.

On the other hand, as shown in FIG. 3 which shows only the first optical waveguide 22, a first photodetector 24 and a second photodetector 25 are disposed on the surface 22a of the optical waveguide 22 for respectively detecting the optical waves 15', 15' converged in the manner as mentioned above. Also, a third photodetector 26 is provided on the surface 29a of the second optical waveguide 29. By way of example, the first photodetector 24 is composed of photodiodes PD1 and PD2 divided from each other by a gap extending in parallel with the y axis, and the second photodetector 25 is composed of photodiodes PD3 and PD4 divided from each other by a gap extending in parallel with the y axis. On the other hand, the third photodetector 26 is composed of a single photodiode PD5. As shown in detail in FIG. 4, the photodiode PD5 is formed by, for example, stacking a lower transparent electrode 27a, a thin film-like photoconductive material 27b, and an upper electrode 27c in this order on the optical waveguide 29. Also, an electric power source 27d is connected to apply a predetermined electric field between the lower transparent electrode 27a and the upper electrode 27c. With the photodiode PD5 having the configuration as mentioned above, when the photoconductive material 27b is exposed to light, a photocurrent of a level proportional to the amount of light flows through the photoconductive material 27b. Therefore, the optical amount which the photoconductive material 27b receives can be detected by detecting the change in potential at a terminal 27e. The photodiodes PD1 to PD4 are constituted in the same manner as the photodiode PD5. The thin film-like photoconductive material 27b may be constituted by, for example, an epitaxial film, a polycrystalline film or an amorphous film formed of Si or Ge as an element of Group IV of the periodic table, Se as an element of Group VI, GaAs of Groups III and V, ZnO or CdS of groups II and VI, or PbS of Groups IV and VI. The thin film-like photoconductive material 27b may also be constituted by a film forming a photodiode by generating the p-n junction or the p-i-n junction by the addition of atoms (B, P or the like) of the Group III or Group V to an amorphous calcogen film (a-Se, a-Se-As-Te or the like) or a film containing amorphous Si as the main constituent and also containing hydrogen and/or fluorine (a-Si:H, a-SiGe:H, a-SiC:H or the like), or by a film forming a photodiode by use of the film containing amorphous Si as the main constituent and also containing hydrogen and/or fluorine and an electrode constituting the Schottky junction.

As shown in FIG. 2, the outputs of the photodiodes PD1 and PD2 are added together by an addition amplifier 34, and the outputs of the photodiodes PD3 and PD4 are added together by an addition amplifier 37. Also, the output of the outer photodiode PD1 of the first photodetector 24 and the output of the outer photodiode PD4 of the second photodetector 25 are added together by an addition amplifier 35, and the outputs of the inner photodiodes PD2 and PD3 are added together by an addition amplifier 36. The outputs of the addition amplifiers 34 and 37 are fed to an addition amplifier 38 and a differential amplifier 40, and the outputs of the addition amplifiers 35 and 36 are fed to a differential amplifier 39. The output of the addition amplifier 38 and the output of the photodiode PD5 are fed to a differential amplifier 41. An output S1 of the differential amplifier 41, an output S2 of the differential amplifier 39, and an output S3 of the differential amplifier 40 are respectively fed to a read-out circuit 42, a focusing coil drive control circuit 43 and a tracking coil drive control circuit 44.

Operations of the first pickup apparatus having the configuration as mentioned above will be described hereinbelow. The light beam (laser beam) 15 emitted by the semiconductor laser 16 and collimated by the collimator lens 17 passes through the support 23, the first optical waveguide 22, the buffer layer 28 and the second optical waveguide 29, and is converged by the objective lens 18 so that the light beam 15 is focused on the reflection surface 14 of the magneto-optical disk 13. The magneto-optical disk 13 is rotated by a rotation drive means (not shown) so that the track is moved in the direction as indicated by the arrow U at the incidence position of the light beam 15. As is well known, the track is a string of image signals, audio signals or the like recorded by use of the directions of magnetization as indicated by the arrows above the reflection surface 14 in FIG. 1. As the direction of magnetization is reversed, the direction of linear polarization of the light beam 15' reflected by the magneto-optical disk 13 rotates reversely with respect to the direction of linear polarization of the light beam 15' reflected by the un-magnetized part. Specifically, the direction of linear polarization of the light beam 15' reflected by the part of the magneto-optical disk 13 magnetized in a direction rotates clockwise from the direction of polarization as indicated by the arrow P in FIG. 2, and the direction of linear polarization of the light beam 15' reflected by the part of the magneto-optical disk 13 magnetized in the reverse direction rotates counter-clockwise from the direction of polarization as indicated by the arrow P.

The S-polarized light component of the reflected light beam 15' passes through the objective lens 18, and is introduced into the second optical waveguide 29 by the FGC 33. Also, the P-polarized light component of the reflected light beam 15' passing through the second optical waveguide 29 is introduced into the first optical waveguide 22 by the FGC 31 and the FGC 32. The optical wave 15' (the reflected light beam 15') guided through the second optical waveguide 29 is converged into a single spot on the y axis by the beam converging effect of the FGC 33. On the other hand, the optical waves 15', 15' (the reflected light beam 15') guided through the first optical waveguide 22 are converged into two spots with the y axis intervening therebetween by the beam converging effects of the FGC 31 and the FGC 32. The first FGC 31 and the second FGC 32 are formed to excite the TE guided mode as mentioned above, and guide the optical waves having the electric field vectors in the directions as indicated by the arrows E, E in FIG. 2 through the optical waveguide 22. On the other hand, the third FGC 33 is formed to excite the TM guided mode, and guide the optical wave having the electric field vector at an angle normal to the drawing sheet in FIG. 2 through the optical waveguide 29. Therefore, when the direction of linear polarization of the reflected light beam 15' rotates clockwise from the direction of polarization as indicated by the arrow P, the optical amount of the reflected light beam 15' introduced by the third FGC 33 into the optical waveguide 29 increases, whereas the optical amounts of the reflected light beam 15' introduced by the first FGC 31 and the second FGC 32 into the optical waveguide 22 decrease. When the direction of linear polarization of the reflected light beam 15' rotates counter-clockwise from the direction of polarization as indicated by the arrow P, the optical amount of the reflected light beam 15' introduced by the third FGC 33 into the optical waveguide 22 decreases, whereas the optical amounts of the reflected light beam 15' introduced by the first FGC 31 and the second FGC 32 into the optical waveguide 22 increase. More specifically, in the case where the angle of the direction of linear polarization of the reflected light beam 15' with respect to the x axis as shown in FIG. 2 is $\phi$, and the total aperture area of the FGC 31 and the FGC 32 and the aperture area of the FGC 33 are equal to each other, the optical amount I1 introduced by the FGC 31 and the FGC 32 into the first optical waveguide 22 and the optical amount I2 introduced by the FGC 33 into the second optical waveguide 29 change in proportion to $\cos^2 \phi$ and $\sin^2 \phi$ as indicated by curves (1) and (2) in FIG. 11. Namely, when the angle $\phi$ is smaller than 45°, the optical amount I1 introduced by the FGC 31 and the FGC 32 into the first optical waveguide 22 is larger than the optical amount I2 introduced by the FGC 33 into the second optical waveguide 29. When the angle $\phi$ exceeds 45°, the aforesaid relationship is reversed. Therefore, by way of example, in the case where the gain of the addition amplifier 38 is adjusted to an appropriate value, the output of the differential amplifier 41 can be made "−" (minus) at the time the direction of linear polarization of the reflected light beam 15' is rotated clockwise from the direction as indicated by the arrow P in FIG. 2, and the output of the differential amplifier 41 can be made "+" (plus) at the time the direction of linear polarization of the reflected light beam 15' is rotated counter-clockwise from the direction as indicated by the arrow P. Accordingly, by discriminating the output S1 of the differential amplifier 41, the directions of magnetization of the magneto-optical disk 13, i.e. the recorded signals, can be detected.

The detection signals generated by the first photodetector 24, the second photodetector 25 and the third photodetector 26 often include noise caused by, for example, fluctuations in optical intensity of the semiconductor laser 16, fluctuations in reflectivity of the recording magnetic film of the magneto-optical disk 13, and the crystal grains. The noise components are in phase with each other between the outputs of the first photodetector 24 and the second photodetector 25 on one hand, and the output of the third photodetector 26 on the other hand. Therefore, by carrying out the differential detection of the signal components in the manner as mentioned above, the noise components are canceled, and read-out signals S1 having a high S/N ratio can be obtained.

Figure 11:
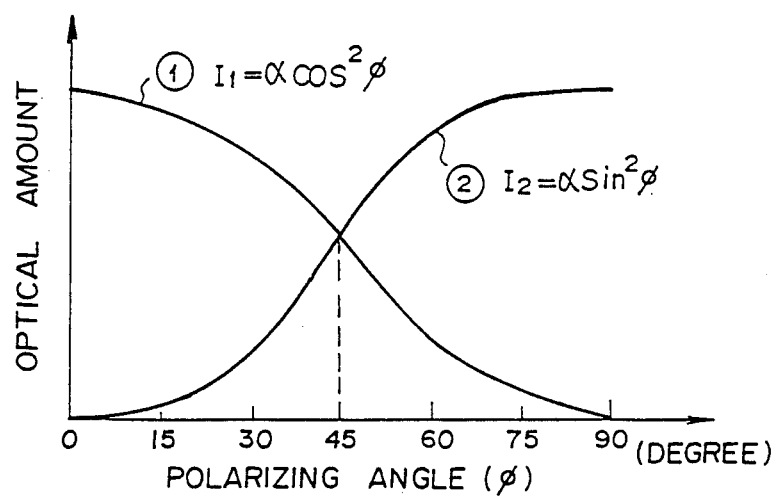
FIG. 11 is a graph showing the relationship between the angle of the plane of linear polarization of the reflected light beam and the optical amount introduced by the focusing grating coupler into the optical waveguide.

Also, as is clear from FIG. 11, in the case where the change width of the angle $\phi$ is constant, the change amounts of the optical amounts I1 and I2 are the largest and the differential output S1 is the largest when the middle of the change is at $\phi = 45°$. Therefore, even though the rotation angle (Kerr rotation angle) of the plane of linear polarization of the reflected light beam 15' caused by the difference in the direction of magnetization of the magneto-optical disk 13 is markedly small (in general, within the range of 0.3° to 0.5°), the rotation of the plane of polarization can be detected accurately.

In the aforesaid embodiment, the difference between the signal obtained by the addition of the output of the first photodetector 24 to the output of the second photodetector 25 and the output signal of the third photodetector 26 is detected. However, the signal detection can also be carried out by detecting the difference between the output signal of the first photodetector 24 or the second photodetector 25 and the output signal of the third photodetector 26. In this case, the output of the first photodetector 24 or the second photodetector 25 fluctuates in accordance with the tracking error. Therefore, the signal detection should preferably be carried out in the manner as in the aforesaid embodiment in order to prevent signal detection error caused by such fluctuations.

The block 12 is moved normal to or approximately normal to the direction as indicated by the arrow U by the optical system feed motor as mentioned above, whereby the incidence position (the position in the radial direction of the magneto-optical disk 13) of the light beam 15 upon the magneto-optical disk 13 is changed and the recorded signals are read out sequentially. The light beam 15 must be made to impinge accurately upon the center of the predetermined signal string (track). The tracking control for accurately maintaining the incidence position of the light beam 15 upon the optical disk 13 will be described below. When the center of the reflected light beam 15' is positioned exactly between the FGC 31 and the FGC 32, the optical amount detected by the first photodetector 24 (i.e. the photodiodes PD1 and PD2) and the optical amount detected by the second photodetector 25 (i.e. the photodiodes PD3 and PD4) coincide with each other. Therefore, in this case, the output S3 of the differential amplifier 40 becomes 0 (zero). On the other hand, when the incidence position of the light beam 15 upon the optical disk 13 becomes incorrect and the optical intensity distribution of the reflected light beam 15' is deviated upwardly in FIG. 2, the optical amount detected by the first photodetector 24 becomes larger than the optical amount detected by the second photodetector 25. Therefore, in this case, the output S3 of the differential amplifier 40 becomes "+" (plus). Conversely, when the optical intensity distribution of the reflected light beam 15' is deviated downwardly in FIG. 2, the output S3 of the differential amplifier 40 becomes "−" (minus). That is, the output S3 of the differential amplifier 40 represents the direction of the tracking error (the direction as indicated by the arrow x in FIG. 2). The output S3 is fed as a tracking error signal to the tracking coil drive control circuit 44. The technique of detecting the tracking error by processing the outputs of the photodiodes PD1 to PD4 in the manner as mentioned above has heretofore been established as the push-pull technique. Upon receiving the tracking error signal S3, the tracking coil drive control circuit 44 feeds an electric current It in accordance with the direction of the tracking error represented by the signal S3 to the tracking coil 19 for moving the objective lens 18 in a direction that cancels the tracking error. In this manner, the light beam 15 is made to impinge accurately upon the center of the signal string.

The focusing control for converging the light beam 15 accurately onto the reflection surface 14 of the magneto-optical disk 13 will be described hereinbelow. When the light beam 15 is focused accurately on the reflection surface 14 of the magneto-optical disk 13, the optical wave 15' converged by the FGC 31 is converged at the middle position between the photodiodes PD1 and PD2. At this time, the optical wave 15' converged by the FGC 32 is converged at the middle position between the photodiodes PD3 and PD4. Therefore, the output of the addition amplifier 35 and the output of the addition amplifier 36 become equal to each other, and the output S2 of the differential amplifier 39 becomes 0 (zero). On the other hand, in the case where the light beam 15 is converged at a position forward from the reflection surface 14, the reflected light beam 15' impinges in the converged form upon the FGC 31 and the FGC 32, and the incidence positions of the optical waves 15', 15' upon the first photodetector 24 and the second photodetector 25 are deviated inwardly, i.e. toward the photodiode PD2 and toward the photodiode PD3. Therefore, in this case, the output of the addition amplifier 35 becomes lower than the output of the addition amplifier 36, and the output S2 of the differential amplifier 39 becomes "−" (minus). Conversely, in the case where the light beam 15 is converged at a position backward from the reflection surface 14, the reflected light beam 15' impinges in the divergent form upon the FGC 31 and the FGC 32, and the incidence positions of the optical waves 15', 15' upon the first photodetector 24 and the second photodetector 25 are deviated outwardly, i.e. toward the photodiode PD1 and toward the photodiode PD4. Therefore, in this case, the output of the addition amplifier 35 becomes higher than the output of the addition amplifier 36, and the output S2 of the differential amplifier 39 becomes "+" (plus). Thus the output S2 of the differential amplifier 39 represents the direction of the focusing error. The output S2 is fed as a focusing error signal to the focusing coil drive control circuit 43. The technique of detecting the focusing error by processing the outputs of the photodiodes PD1 to PD4 in the manner as mentioned above has heretofore been carried out in the Foucault technique using a Foucault prism. Upon receiving the focusing error signal S2, the focusing coil drive control circuit 43 feeds an electric current If in accordance with the direction of the focusing error represented by the signal S2 to the focusing coil 20 for moving the objective lens 18 in a direction that cancels the focusing error. In this manner, the light beam 15 is made to converge accurately onto the reflection surface 14 of the magneto-optical disk 13.

In the course of advance of the light beam 15 emitted by the semiconductor laser 16 from the collimator lens 17 toward the objective lens 18, a part of the light beam 15 is taken by the FGC 31, the FGC 32 and the FGC 33 into the optical waveguides 22 and 29. Therefore, in order to prevent the light beam 15 from being reflected by edge faces 22c and 29c of the optical waveguides 22 and 29 respectively and detected by the first photodetector 24, the second photodetector 25 and the third photodetector 26, a light absorbing member 45 should preferably be secured to the edge faces 22c and 29c, or the edge faces 22c and 29c should preferably be processed into a rough surface.

In the aforesaid embodiment, the FGC 31 and the FGC 32 are formed so that their gratings closely contact each other. However, the FGC 31 and the FGC 32 may be formed independently of each other in slightly spaced relation. This also applies to the embodiments described below.

Also, the FGC 31 and the FGC 32 may be formed so that the optical waves 15', 15' converged by the FGC 31 and the FGC 32 intersect each other, i.e. so that the position of optical wave convergence by the FGC 31 is on the lower side of the y axis in FIG. 2 and the position of optical wave convergence by the FGC 32 is on the upper side of the y axis.

In the aforesaid embodiment, the first FGC 31 and the second FGC 32 excite the TE guided mode, and the third FGC 33 excites the TM guided mode. However, conversely, the first FGC 31 and the second FGC 32 may be formed to excite the TM guided mode, and the third FGC 33 may be formed to excite the TE guided mode. Also, in the aforesaid embodiment, the first optical waveguide 22 provided with the first FGC 31 and the second FGC 32 is overlaid on the support 23, and the second optical waveguide 29 is overlaid on the first optical waveguide 22. However, the positions of the optical waveguides 22 and 29 may be reversed.

Further embodiments of the first pickup apparatus for a magneto-optical recording medium in accordance with the present invention will hereinbelow be described with reference to FIGS. 5 to 10, 12 and 13. In FIGS. 5 to 10, 12 and 13, similar elements are numbered with the same reference numerals with respect to FIG. 1.

Figure 5:
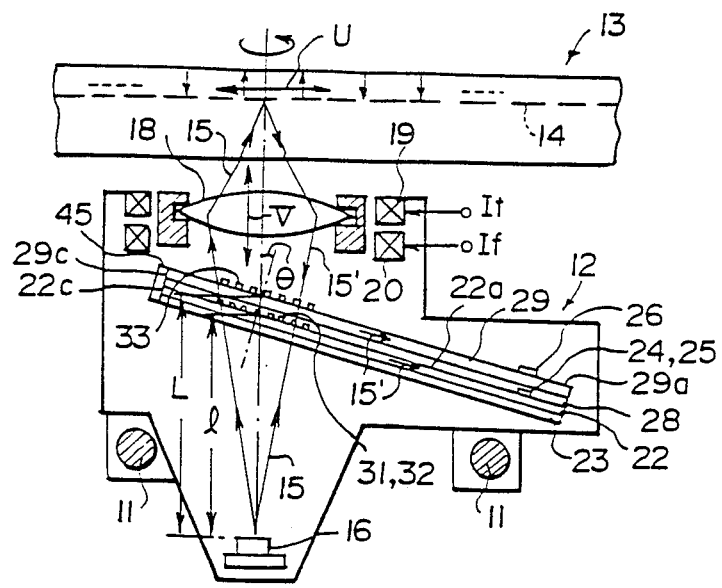

In an embodiment shown in FIG. 5, the collimator lens 17 in the embodiment shown in FIG. 1 is omitted, and the light beam 15' reflected by the magneto-optical disk 13 is taken in the converged form into the optical waveguides 22 and 29. Also with this configuration, the recorded signals, tracking error and focusing error can be detected by detecting the optical waves 15', 15', 15' converged inside of the optical waveguides 22 and 29 by the first photodetector 24, the second photodetector 25 and the third photodetector 26 of the types as shown in FIG. 2, and processing the detection signals in the manner as mentioned above.

When the positions on the optical waveguide 22 and the coordinates of the optical wave converging positions by the FGC 31 and the FGC 32 are defined in the same manner as in the embodiment shown in FIG. 1, the m'th grating pattern of each of the FGC 31 and the FGC 32 in the embodiment shown in FIG. 5 is expressed as $$\sqrt{x^2 + (y - l\sin\theta)^2 + (l\cos\theta)^2} -$$
$$N_{TE}\sqrt{(x \mp Fx)^2 + (y - Fy)^2} = m\lambda + \text{const.}$$

(double signs: "+" for the FGC 31, "−" for the FGC 32)

where $\lambda$ denotes the optical wavelength of the reflected light beam 15', $\theta$ denotes the angle between the center axis of the reflected light beam 15' and the optical waveguide 22, l denotes the distance from the beam diverging point to the FGC 31 and the FGC 32 along the beam center axis as shown in FIG. 5, and $N_{TE}$ denotes the effective refractive index of the optical waveguide 22 with respect to the TE mode optical wave.

On the other hand, when the coordinates of the optical wave converging position by the FGC 33 are defined in the same manner as in the embodiment shown in FIG. 1, the m'th grating pattern of the FGC 33 is expressed as $$\sqrt{x^2 + (y - L\sin\theta)^2 + (L\cos\theta)^2} -$$
$$N_{TM}\sqrt{x^2 + (y - Fy)^2} = m\lambda + \text{const.}$$

where L denotes the distance from the beam diverging point to the FGC 33 along the beam center axis, $N_{TM}$ denotes the effective refractive index of the optical waveguide 29 with respect to the TM mode optical wave, and the other factors are as defined just above with reference to FIG. 5.

Figure 6:
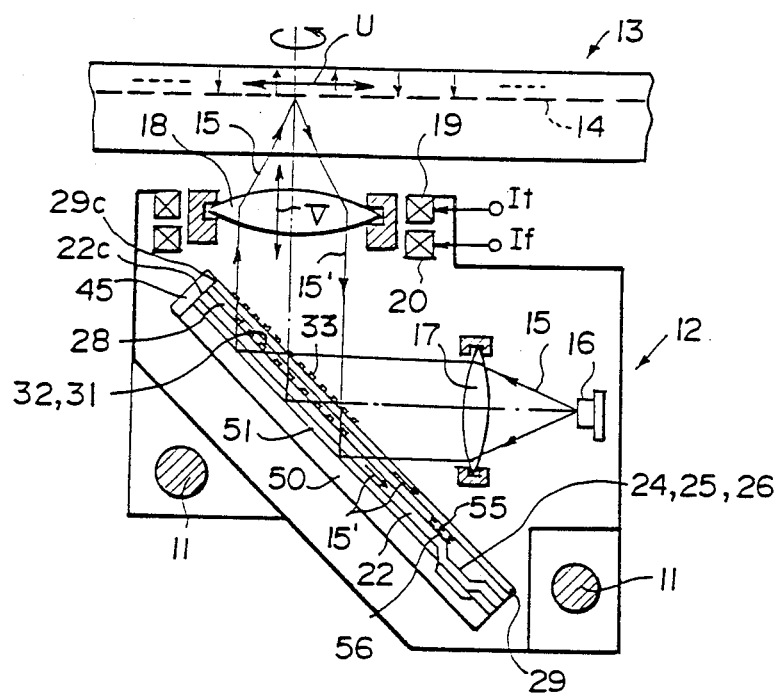

In an embodiment shown in FIG. 6, a support 50 is formed of a material exhibiting a substantially large refractive index, and the light beam 15 is reflected by the boundary between the support 50 and a buffer layer 51 toward the magneto-optical disk 13. In order to reflect the light beam 15 in this manner, a reflecting thin film formed of a metal or the like may be provided between the buffer layer 51 and the support 50. Also in this case, the light beam 15' reflected by the magneto-optical disk 13 is introduced by the FGC 31, the FGC 32 and the FGC 33 into the optical waveguides 22 and 29.

Figure 7:
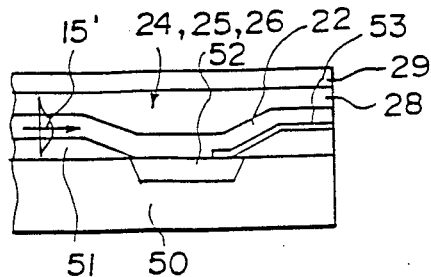
FIG. 7 is a side view showing the photodetector in the embodiment shown in FIG. 6, FIGS. 8, 9 and 10 are side views showing still further embodiments of the first pickup apparatus for a magneto-optical recording medium in accordance with the present invention.

With the configuration as shown in FIG. 6, the support 50 need not be formed of a transparent member. Therefore, in this case, it becomes possible to form the support 50 by use of, for example, an n type Si support, to dispose the buffer layer 51 for preventing the spreading-out optical wave (evanescent optical wave) of the optical waves 15', 15' which are being guided through the optical waveguide 22 from entering the support 50, and to integrate the photodiodes PD1 to PD5 by the provision of a p type Si layer 52 and an electrode 53 as shown in FIG. 7. The photodiodes PD1 to PD5 integrated in this manner are advantageous from the viewpoint of achieving quick response.

In this embodiment, all of the photodiodes PD1 to PD5 are formed on the surface of the first optical waveguide 22. Therefore, as shown in FIG. 6, a linear grating coupler (hereinafter referred to as LGC) 55 is provided on the surface of the second optical waveguide 29 on the side of the buffer layer 28. The LGC 55 radiates the optical wave 15', which is guided through the second optical waveguide 29 and converged, out of the second optical waveguide 29. On the other hand, an LGC 56 is provided on the surface of the first optical waveguide 22 on the side of the buffer layer 28 so that the LGC 56 faces the LGC 55. The guided optical wave 15' radiated by the LGC 55 out of the second optical waveguide 29 is introduced by the LGC 56 into the first optical waveguide 22, and detected by the photodiode PD5. The relationship between the positions of the photodiodes PD1 to PD5 is the same as shown in FIG. 2.

Conversely to the aforesaid embodiment, the guided and converged optical waves 15', 15' (the reflected light beam 15') may be radiated out of the first optical waveguide 22 and introduced into the second optical waveguide 29. Also, all of the photodiodes PD1 to PD5 may be provided on the second optical waveguide 29 to detect the guided optical waves 15', 15', 15'.

Figure 8:
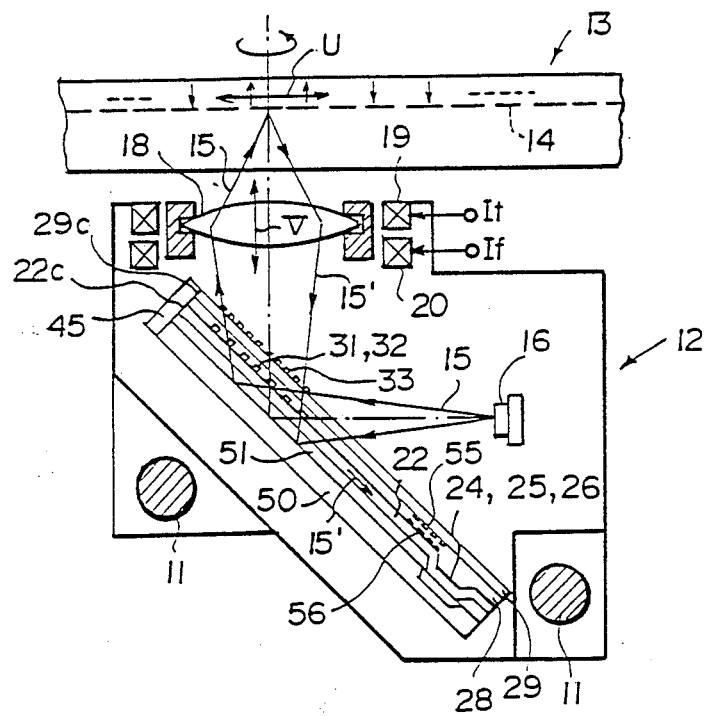

An embodiment shown in FIG. 8 is different from the embodiment shown in FIG. 6 in that the light beam 15 emitted by the semiconductor laser 16 in the divergent form is reflected in this form by the boundary between the support 50 and the buffer layer 51 toward the magneto-optical disk 13.

Figure 9:
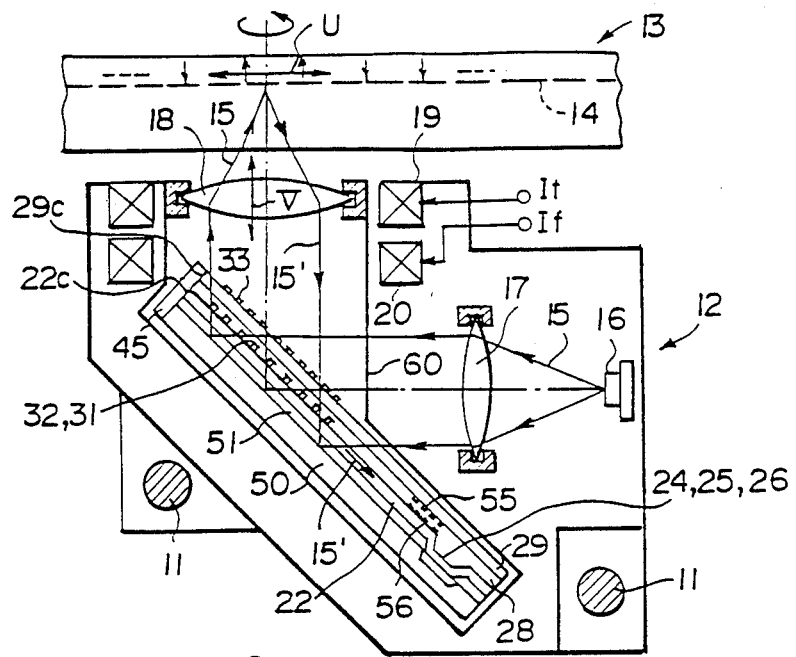

In an embodiment shown in FIG. 9, the optical waveguides 22 and 29 and the objective lens 18 are secured to a single head 60, and the head 60 is supported moveably in the tracking direction and in the focusing direction with respect to the block 12. The head 60 is moved by the tracking coil 19 and the focusing coil 20. Specifically, in this embodiment, the optical waveguides 22 and 29 are moved together with the objective lens 18 for the purposes of tracking control and focusing control. With this configuration, the problem that the objective lens 18 is deviated from the optical waveguides 22 and 29 in the course of tracking control as in the case where the objective lens 18 along is moved can be eliminated, and tracking control can be carried out more accurately.

In the embodiment shown in FIG. 9, the light beam 15 reflected by the boundary between the support 50 and the buffer layer 51 is made to impinge upon the magneto-optical disk 13. However, also in the case where the optical waveguides 22 and 29 and the objective lens 18 are moved integrally with each other as mentioned above, it is possible to constitute the apparatus so that the light beam 15 passing through the optical waveguides 22 and 29 impinges upon the magneto-optical disk 13, or to constitute the apparatus so that the light beam 15 passes through the optical waveguides 22 and 29 in the divergent form or is reflected in the divergent form by the boundary between the support 50 and the buffer layer 51. Also, besides the optical waveguides 22 and 29 and the objective lens 18, the semiconductor laser 16 and the collimator lens 17 may be secured to the head 60 and may be moved integrally with the optical waveguides 22 and 29 and the objective lens 18.

Figure 10:
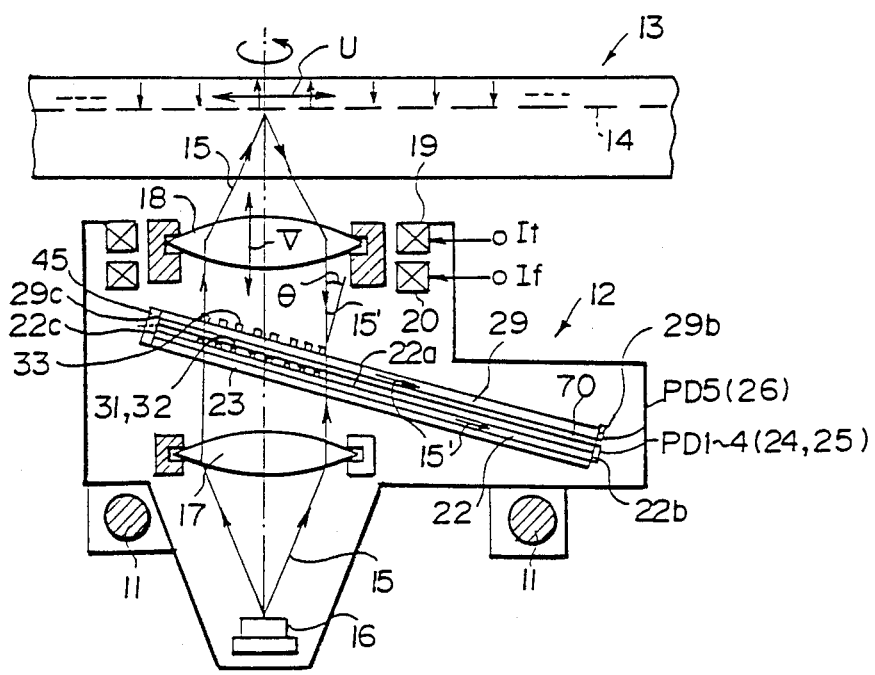

In an embodiment shown in FIG. 10, the first optical waveguide 22 is formed on the transparent support 23 as in the embodiment shown in FIG. 1, and the photodiodes PD1, PD2 constituting the first photodetector 24 and the photodiodes PD3, PD4 constituting the second photodetector 25 are secured to the polished edge face 22b of the first optical waveguide 22. On the other hand, the second optical waveguide 29 is formed on a transparent support 70 independent of the support 23, and the photodiode PD5 is coupled with the edge face 29b of the second optical waveguide 29. Also, the first optical waveguide 22 and the second optical waveguide 29 are combined integrally so that the first FGC 31 and the second FGC 32 on one hand and the third FGC 33 on the other hand overlap each other. The other configuration is the same as in the embodiment shown in FIG. 1.

In the case where the first optical waveguide 22 and the second optical waveguide 29 are formed on independent supports and then disposed in overlapping relation to each other, the same effects as the case where both optical waveguides 22 and 29 are stacked on a common support can be obtained. Also, in the cases where the pickup apparatus is constituted as shown in FIGS. 5, 6, 8 and 9, the first optical waveguide 22 and the second optical waveguide 29 may be formed on independent supports.

Figure 12:
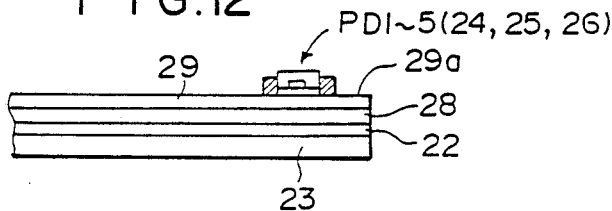
FIGS. 12 and 13 are side views showing further examples of the photodetectors used in the first pickup apparatus for a magneto-optical recording medium in accordance with the present invention.
Figure 13:
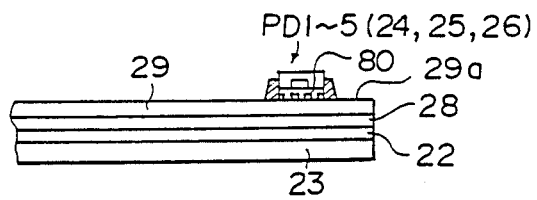

In the aforesaid six embodiments, the first photodetector 24, the second photodetector 25 and the third photodetector 26 are secured to or integrated with the surfaces 22a, 29a of the optical waveguides 22, 29, or coupled with the edge faces 22b, 29b. However, the first photodetector 24, the second photodetector 25 and the third photodetector 26 may be disposed in any other manner on the optical waveguides 22 and 29. For example, as shown in FIG. 12, the photodetectors 24, 25 and 26 may be disposed close to the surface 29a of the second optical waveguide 29. In this case, the optical wave guided through the first optical waveguide 22 may be radiated out of the first optical waveguide 22 and introduced into the second optical waveguide 29 in the manner as mentioned with reference to FIG. 6. Also, in the case where the photodetectors 24, 25 and 26 are disposed close to the surface 29a of the second optical waveguide 29 in this manner, a diffraction grating 80 for radiating the guided optical waves (reflected light beam) 15', 14', 15' out of the optical waveguide 29 may be disposed on the surface 29a of the optical waveguide 29 as shown in FIG. 13, thereby to improve the light receiving efficiencies of the photodetectors 24, 25 and 26.

Besides the aforesaid method of making the FGC 31, the FGC 32 and the FGC 33, they can be formed by the planar technique by use of a known photolithographic method, a known holographic transfer method or the like, and can be easily mass-produced through duplication.

Embodiments of the second pickup apparatus for a magneto-optical recording medium in accordance with the present invention will be described hereinbelow.

Figure 14:
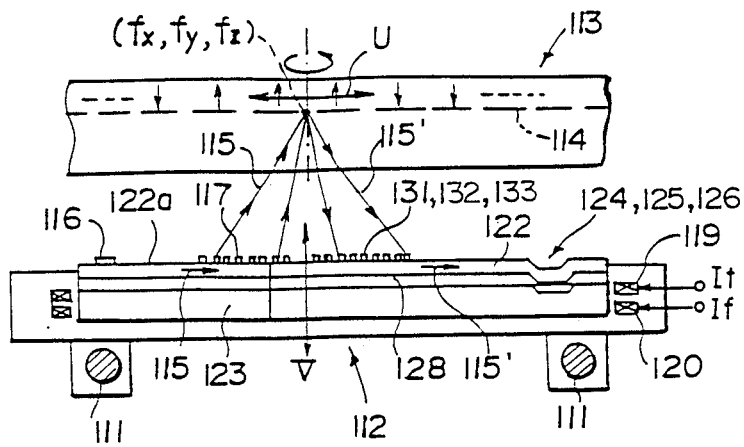
FIG. 14 is a side view showing an embodiment of the second pickup apparatus for a magneto-optical recording medium in accordance with the present invention.
Figure 15:
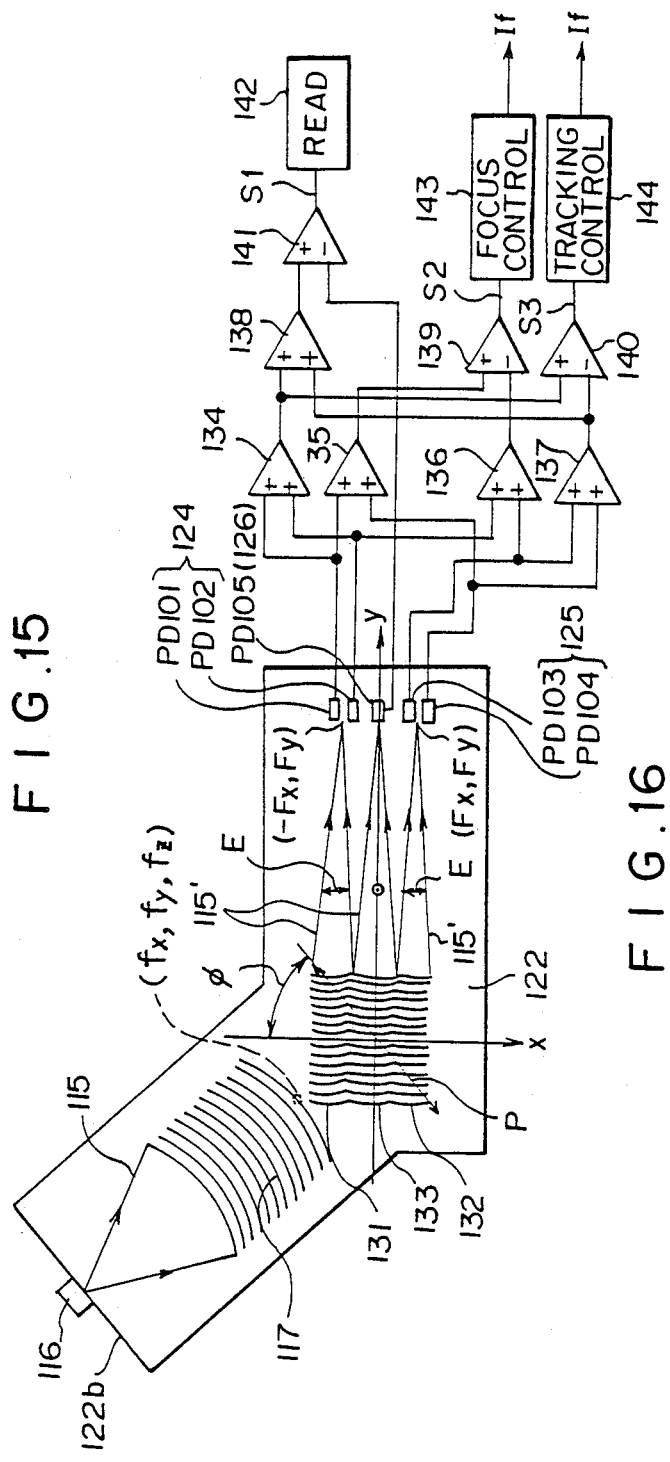
FIG. 15 is a schematic view showing the top plan shape of the optical waveguides in the embodiment shown in FIG. 14 and the electric circuit used for the embodiment.

FIG. 14 shows an embodiment of the second pickup apparatus for a magneto-optical recording medium in accordance with the present invention, and FIG. 15 shows the top plan view of the optical waveguides in the embodiment shown in FIG. 14 and an electric circuit used for the embodiment shown in FIG. 14. With reference to FIG. 14, the second pickup apparatus is provided with rods 111, 111 extending at an angle approximately normal to the drawing sheet in FIG. 14, and a block 112 moveable along the rods 111, 111. In order to follow along a signal string (track) along a predetermined groove, the block 112 is moved normal to or approximately normal to the direction of the track (i.e. the direction as indicated by the arrow U at the light beam incidence position) by, for example, a precision feed screw and an optical system feed motor.

A Si support 123 which may be, for example, the n type, is supported on the block 112. A first optical waveguide 122 is provided on the support 123 via a buffer layer 128. One edge face 122b of the first optical waveguide 122 is polished, and a semiconductor laser 116 for producing a linearly polarized light beam (a laser beam) 115 is secured to the edge face 122b. The light beam 115 produced by the semiconductor laser 116 enters the first optical waveguide 112 from the edge face 122b, and advances inside of the first optical waveguide 122, by way of example, in the TE guided mode. On the other hand, a first FGC 117 is provided on a surface 122a of the first optical waveguide 122. The first FGC 117 is a diffraction grating having a curvature and "chirp⇌. The first FGC 117 radiates the light beam (optical wave) 115, which is guided through the first optical waveguide 122, out of the first optical waveguide 122, and converges the radiated optical wave 115 on a reflection surface 114 of a magneto-optical disk 113. For the purposes of tracking control and focusing control as will be described later, the support 123 is supported moveably in a tracking direction normal to the direction as indicated by the arrow U and in a focusing direction as indicated by the arrow V, and is moved in these directions by a tracking coil 119 and a focusing coil 120.

The first optical waveguide 122 is disposed so that the optical wave 115 is not regularly reflected by the reflection surface 114. Therefore, the optical wave 115 is reflected by the magneto-optical disk 113 as a reflected optical wave 15' to a position spaced from the first FGC 117. A second FGC 131, a third FGC 132, and a fourth FGC 133 are disposed adjacent to one another on the surface 122a of the first optical waveguide 122 at the position upon which the reflected optical wave 115' impinges. Each of the second FGC 131, the third DGC 132 and the fourth FGC 133 is a diffraction grating having a curvature or a curvature and "chirp". The second FGC 131, the third FGC 132 and the fourth FGC 133 respectively introduce the reflected optical wave 115' into the first optical waveguide 122 and converge the reflected optical waves 115', 115', 115' thus guided through the first optical waveguide 122 respectively into a single spot in the first optical waveguide 122. As shown in FIG. 15, the second FGC 131 and the third FGC 132 are disposed side by side so that a y axis on the first optical waveguide 122 normal to the aforesaid tracking direction and passing through nearly the center of the reflected optical wave 115' intervenes between the FGC 131 and the FGC 132. Also, the FGC 131 and the FGC 132 are formed to converge the optical waves 115', 115' to positions spaced from each other with the y axis intervening therebetween. The fourth FGC 133 is provided side by side with the second FGC 131 and the third FGC 132 therebetween. Also, grating pitches of the second FGC 131, the third FGC 132 and the fourth FGC 133 are adjusted so that the second FGC 131 and the third FGC 132 excite the TE guided mode, and the fourth FGC 133 excites the TM guided mode.

When positions on the first optical waveguide 122 are defined by the x axis, i.e. the axis in the tracking direction, and the y axis in FIG. 15, the optical wave condensing position on the magneto-optical disk 113 by the first FGC 117 is expressed as (fx, fy, fz) and coordinates of the optical wave converging positions by the FGC 131 and the FGC 132 are respectively expressed as (−Fx, Fy) and (Fx, Fy), an m'th grating pattern of each of the FGC 131 and the FGC 132 having the aforesaid effects is expressed as $$\sqrt{(x-fx)^2 + (y-fy)^2 + fz^2} +$$

$$N_{TE}\sqrt{(x \mp Fx)^2 + (y-Fy)^2} = m\lambda + \text{const.}$$

(double signs: "+" for the FGC 131, "−" for the FGC 132)

where λ denotes the optical wavelength of the reflected optical wave 115', ↓ denotes the angle of incidence of the reflected optical wave 115' upon the FGC 131 and the FGC 132, and $N_{TE}$ denotes the effective refractive index of the first optical waveguide 122 with respect to the TE mode optical wave.

On the other hand, when coordinates of the optical wave converging position by the FGC 133 are expressed as (0, Fy), an m'th grating pattern of the FGC 133 is expressed as $$\sqrt{(x-fx)^2 + (y-fy)^2 + fz^2} +$$

$$N_{TM}\sqrt{x^2 + (y-Fy)^2} = m\lambda + \text{const.}$$

where $N_{TM}$ denotes the effective refractive index of the first optical waveguide 122 with respect to the TM mode optical wave, and the other factors are as defined above.

As shown in FIG. 15, the FGC 131, the FGC 132 and the FGC 133 are disposed so that the x axis is inclined at an angle of 45° with respect to the direction of linear polarization of the reflected optical wave 115' as indicated by the arrow P. The direction of linear polarization of the reflected optical wave 115' rotates in accordance with the direction of magnetization in the magneto-optical disk 113. Therefore, in this embodiment, the direction of linear polarization of the optical wave 115' reflected by an unmagnetized part is taken as a reference, and it is adjusted so that the x axis makes an angle of 45° with respect to said reference direction of linear polarization. The FGC 131, the FGC 132 and the FGC 133 may also be provided on the surface of the first optical waveguide 122 opposite to the surface 122a, i.e. on the lower surface thereof in FIG. 14.

The first optical waveguide 122 may be formed by, for example, overlaying the buffer layer 128 formed of SiO₂ on the Si support 123, and then sputtering #7059 glass onto the buffer layer 128. On the other hand, the FGC 131, the FGC 132 and the FGC 133 may be formed by, for example, forming a Si-N film on the first optical waveguide 122 by PCVD (plasma-enhanced chemical vapor deposition), forming a resist pattern by the electron beam direct drawing method, and then transferring the pattern to the Si-N film by RIE. By way of example, in the case where the optical waveguide 122 (thickness: 0.76 μm), the FGC 131, the FGC 132 and the FGC 133 are formed of the aforesaid materials, the center period of each of the FGC 131 and the FGC 132 which excite the TE guided mode and which have the grating patterns as defined by the aforesaid pattern formulas is 0.782 μm, and the center period of the FGC 133 which excites the TM guided mode is 0.786 μm.

On the other hand, a first photodetector 124, a second photodetector 125 and a third photodetector 126 are disposed on the surface 122a of the optical waveguide 122 for respectively detecting the optical waves 155', 115', 115' converged in the manner as mentioned above. By way of example, the first photodetector 124 is composed of photodiodes PD101 and PD102 divided from each other by a gap extending in parallel with the y axis, and the second photodetector 125 is composed of photodiodes PD103 and PD104 divided from each other by a gap extending in parallel with the y axis. On the other hand, the third photodetector 126 is composed of a single photodiode PD105. As shown in detail in FIG. 16, the photodiodes PD101 to PD105 are integrated by forming the buffer layer 128 for preventing the spreading-out optical wave (evanescent optical wave) of the optical waves 115', 115', 115', which are being guided, from entering the support 123 on the n type Si support 123, and providing a p type Si layer 129 and an electrode 130. The photodiodes PD101 to PD105 integrated in this manner are advantageous from the viewpoint of achieving quick response.

As shown in FIG. 15, the outputs of the photodiodes PD101 and PD102 are added together by an addition amplifier 134, and the outputs of the photodiodes PD103 and PD104 are added together by an addition amplifier 137. Also, the output of the outer photodiode PD101 of the first photodetector 124 and the output of the outer photodiode PD104 of the second photodetector 125 are added together by an addition amplifier 135, and the outputs of the inner photodiodes PD102 and PD103 are added together by an addition amplifier 136. The outputs of the addition amplifiers 134 and 137 are fed to an addition amplifier 138 and a differential amplifier 140, and the outputs of the addition amplifiers 135 and 136 are fed to a differential amplifier 139. The output of the addition amplifier 138 and the output of the photodiode PD105 are fed to a differential amplifier 141. An output S1 of the differential amplifier 141, an output S2 of the differential amplifier 139, and an output S3 of the differential amplifier 140 are respectively fed to a read-out circuit 142, a focusing coil drive control circuit 143 and a tracking coil drive control circuit 144.

Operations of the second pickup apparatus having the configuration as mentioned above will be described hereinbelow. The light beam (laser beam) 115 produced by the semiconductor laser 116 and guided through the first optical waveguide 122 in the divergent form is radiated by the first FGC 117 out of the first optical waveguide 122 and is converged to focus on the reflection surface 114 of the magneto-optical disk 113. The magneto-optical disk 133 is rotated by a rotation drive means (not shown) so that the track is moved in the direction as indicated by the arrow U at the incidence position of the optical wave 115. As is well known, the track is a string of image signals, audio signals or the like recorded by use of the directions of magnetization as indicated by the arrows above the reflection surface 114 in FIG. 14. As the direction of magnetization is reversed, the direction of linear polarization of the optical wave 115' reflected by the magneto-optical disk 113 rotates reversely with respect to the direction of linear polarization of the optical wave 115' reflected by the un-magnetized part. Specifically, the direction of linear polarization of the optical wave 115' reflected by the part of the magneto-optical disk 113 magnetized in a direction rotates clockwise from the direction of polarization as indicated by the arrow P in FIG. 15, and the direction of linear polarization of the optical wave 115' reflected by the part of the magneto-optical disk 113 magnetized in the reverse direction rotates counter-clockwise from the direction of polarization as indicated by the arrow P.

The reflected optical wave 115' is introduced into the first optical waveguide 122 by the FGC 131, the FGC 132 and the FGC 133. The optical waves 115', 115', 115' (the reflected light beam 115') guided through the first optical waveguide 122 are converged into two spots with the y axis intervening therebetween and a single spot on the y axis by the beam converging effects of the FGC 131, the FGC 132 and the FGC 133. The second FGC 131 and the third FGC 132 are formed to excite the TE guided mode as mentioned above, and guide the optical waves having the electric field vectors in the directions as indicated by the arrows E, E in FIG. 15 through the optical waveguide 122. On the other hand, the fourth FGC 133 is formed to excite the TM guided mode, and guide the optical wave having the electric field vector at an angle normal to the drawing sheet in FIG. 15 through the optical waveguide 122. Therefore, when the direction of linear polarization of the reflected optical wave 115' rotates clockwise from the direction of polarization as indicated by the arrow P, the optical amount of the reflected optical wave 115' introduced by the fourth FGC 133 into the optical waveguide 122 increases, whereas the optical amounts of the reflected optical wave 115' introduced by the second FGC 131 and the third FGC 132 into the optical waveguide 122 decrease. When the direction of linear polarization of the reflected optical wave 115' rotates counter-clockwise from the direction of polarization as indicated by the arrow P, the optical amount of the reflected optical wave 115' introduced by the fourth FGC 133 into the optical waveguide 122 decreases, whereas the optical amounts of the reflected optical wave 115' introduced by the second FGC 131 and the third FGC 132 into the optical waveguide 122 increase. More specifically, in the case where the angle of the direction of linear polarization of the reflected optical wave 115' with respect to the x axis as shown in FIG. 15 is $\phi$, and the aperture area of the FGC 131 or the FGC 132 and the aperture area of the FGC 133 are equal to each other, the optical amount I1 introduced by the FGC 131 or the FGC 132 into the optical waveguide 122 and the optical amount I2 introduced by the FGC 133 into the optical waveguide 122 change in proportion to $\cos^2 \phi$ and $\sin^2 \phi$ as indicated by curves (1) and (2) in FIG. 11. Namely, when the angle $\phi$ is smaller than 45°, the optical amount I1 introduced by the FGC 131 or the FGC 132 into the optical waveguide 122 is larger than the optical amount I2 introduced by the FGC 133 into the optical waveguide 122. When the angle $\phi$ exceeds 45°, the aforesaid relationship is reversed. Therefore, by way of example, in the case where the gain of the addition amplifier 138 is adjusted to an appropriate value, the output of the differential amplifier 141 can be made "−" (minus) at the time the direction of linear polarization of the reflected optical wave 115' is rotated clockwise from the direction as indicated by the arrow P in FIG. 15, and the output of the differential amplifier 141 can be made "+" (plus) at the time the direction of linear polarization of the reflected optical wave 115' is rotated counter-clockwise from the direction as indicated by the arrow P. Accordingly, by discriminating the output S1 of the differential amplifier 141, the directions of magnetization of the magneto-optical disck 113, i.e. the recorded signals, can be detected.

The detection signals generated by the first photodetector 124, the second photodetector 125 and the third photodetector 126 often include noise caused by, for example, fluctuations in optical intensity of the semiconductor laser 116, fluctuations in reflectivity of the recording magnetic film of the magneto-optical disk 113, and the crystal grains. The noise components are in phase with each other between the outputs of the first photodetector 124 and the second photodetector 125 on one hand, and the output of the third photodetector 126 on the other hand. Therefore, by carrying out the differential detection of the signal components in the manner as mentioned above, the noise components are canceled, and read-out signals S1 having a high S/N ratio can be obtained.

Also, as is clear from FIG. 11, in the case where the change width of the angle $\phi$ is constant, the change amounts of the optical amounts I1 and I2 are the largest and the differential output S1 is the largest when the middle of the change is at $\phi=45°$. Therefore, even though the rotation angle (Kerr rotation angle) of the plane of linear polarization of the reflected optical wave 115' caused by the difference in the direction of magnetization of the magneto-optical disk 113 is markedly small (in general, within the range of 0.3° to 0.5°), the rotation of the plane of polarization can be detected accurately.

In the aforesaid embodiment, the difference between the signal obtained by the addition of the output of the first photodetector 124 to the output of the second photodetector 125 and the output signal of the third photodetector 126 is detected. However, the signal detection can also be carried out by detecting the difference between the output signal of the first photodetector 124 or the second photodetector 125 and the output signal of the third photodetector 126. In this case, the output of the first photodetector 124 or the second photodetector 125 fluctuates in accordance with the tracking error. Therefore, the signal detection should preferably be carried out in the manner as in the aforesaid embodiment in order to prevent signal detection error caused by such fluctuations.

The block 112 is moved normal to or approximately normal to the direction as indicated by the arrow U by the optical system feed motor as mentioned above, whereby the incidence position (the position in the radial direction of the magneto-optical disk 113) of the optical wave 115 upon the magneto-optical disk 113 is changed and the recorded signals are read out sequentially. The optical wave 115 must be made to impinge accurately upon the center of the predetermined signal string (track). The tracking control for accurately maintaining the incidence position of the optical wave 115 upon the optical disk 113 will be described below. When the center of the reflected optical wave 115' is positioned exactly between the FGC 131 and the FGC 132, the optical amount detected by the first photodetector 124 (i.e. the photodiodes PD101 and PD102) and the optical amount detected by the second photodetector 125 (i.e. the photodiodes PD103 and PD104) coincide with each other. Therefore, in this case, the output S3 of the differential amplifier 140 becomes 0 (zero). On the other hand, when the incidence position of the optical wave 115 upon the optical disk 113 becomes incorrect and the optical intensity distribution of the reflected optical wave 115' is deviated upwardly in FIG. 15, the optical amount detected by the first photodetector 124 becomes larger than the optical amount detected by the second photodetector 125. Therefore, in this case, the output S3 of the differential amplifier 140 becomes "+" (plus). Conversely, when the optical intensity distribution of the reflected optical wave 115' is deviated downwardly in FIG. 15, the output S3 of the differential amplifier 140 becomes "−" (minus). That is, the output S3 of the differential amplifier 140 represents the direction of the tracking error (the direction as indicated by the arrow x in FIG. 15). The output S3 is fed as a tracking error signal to the tracking coil drive control circuit 144. The technique of detecting the tracking error by processing the outputs of the photodiodes PD101 to PD104 in the manner as mentioned above has heretofore been established as the push-pull technique. Upon receiving the tracking error signal S3, the tracking coil drive control circuit 144 feeds an electric current It in accordance with the direction of the tracking error represented by the signal S3 to the tracking coil 119 for moving the support 123 in a direction that cancels the tracking error. In this manner, the optical wave 115 is made to impinge accurately upon the center of the signal string.

The focusing control for converging the optical wave 115 accurately onto the reflection surface 114 of the magneto-optical disk 113 will be described hereinbelow. When the optical wave 115 is focused accurately on the reflection surface 114 of the magneto-optical disk 113, the optical wave 115' converged by the FGC 131 is converged at the middle position between the photodiodes PD101 and PD102. At this time, the optical wave 115' converged by the FGC 132 is converged at the middle position between the photodiodes PD103 and PD104. Therefore, the output of the addition amplifier 135 and the output of the addition amplifier 136 become equal to each other, and the output S2 of the differential amplifier 139 becomes 0 (zero). On the other hand, in the case where the optical wave 115 is converged at a position forward from the reflection surface 114, the reflected optical wave 115' impinges in the converged form upon the FGC 131 and the FGC 132, and the incidence positions of the optical waves 115', 115' upon the first photodetector 124 and the second photodetector 125 are deviated inwardly, i.e. toward the photodiode PD102 and toward the photodiode PD103. Therefore, in this case, the output of the addition amplifier 135 becomes lower than the output of the addition amplifier 136, and the output S2 of the differential amplifier 139 becomes "−" (minus). Conversely, in the case where the optical wave 115 is converged at a position backward from the reflection surface 114, the reflected optical wave 115' impinges in the divergent form upon the FGC 131 and the FGC 132, and the incidence positions of the optical waves 115', 115' upon the first photodetector 124 and the second photodetector 125 are deviated outwardly, i.e. toward the photodiode PD101 and toward the photodiode PD104. Therefore, in this case, the output of the addition amplifier 135 becomes higher than the output of the addition amplifier 136, and the output S2 of the differential amplifier 139 becomes "+" (plus). Thus the output S2 of the differential amplifier 139 represents the direction of the focusing error. The output S2 is fed as a focusing error signal to the focusing coil drive control circuit 143. The technique of detecting the focusing error by processing the outputs of the photodiodes PD101 to PD104 in the manner as mentioned above has heretofore been carried out in the Foucault technique using a Foucault prism. Upon receiving the focusing error signal S2, the focusing coil drive control circuit 143 feeds an electric current If in accordance with the direction of the focusing error represented by the signal S2 to the focusing coil 120 for moving the support 123 in a direction that cancels the focusing error. In this manner, the optical wave 115 is made to converge accurately onto the reflection surface 114 of the magneto-optical disk 113.

In this embodiment, the optical wave 115 is not regularly reflected by the reflection surface 114, and the reflected optical wave 115' does not enter the optical waveguide 122 from the first FGC 117 and does not return to the semiconductor laser 116. Therefore, the problem that mode hopping of the semiconductor laser 116 is caused by the return light and output fluctuations or the like arise can be prevented.

In the aforesaid embodiment, the FGC 131, the FGC 132 and the FGC 133 are formed so that their gratings closely contact each other. However, the FGC 131, the FGC 132 and the FGC 133 may be formed independently of each other in slightly spaced relation. This also applies to the embodiments described below.

Also, the FGC 131 and the FGC 132 may be formed so that the reflected optical waves 15', 15' converged by the FGC 131 and the FGC 132 intersect each other, i.e. so that the position of optical wave convergence by the FGC 131 is on the lower side of the y axis in FIG. 15 and the position of optical wave convergence by the FGC 132 is on the upper side of the y axis.

In the aforesaid embodiment, the second FGC 131 and the third FGC 132 excite the TE guided mode, and the fourth FGC 133 excites the TM guided mode. However, conversely, the second FGC 131 and the third FGC 132 may be formed to excite the TM guided mode, and the fourth FGC 133 may be formed to excite the TE guided mode. Also, the FGC 131 and the FGC 132 may be disposed in close contact with each other or adjacent to each other, and the fourth FGC 133 may be disposed outward from one or both of the FGC 131 and the FGC 132.

Further embodiments of the second pickup apparatus for a magneto-optical recording medium in accordance with the present invention will hereinbelow be described with reference to FIGS. 17 to 25. In FIGS. 17 to 25, similar elements are numbered with the same reference numerals with respect to FIG. 14.

Figure 17:
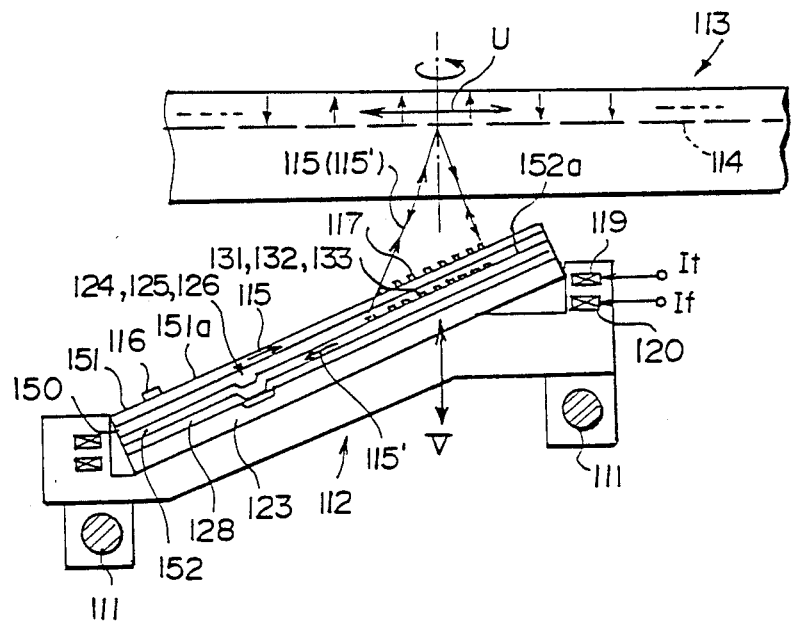
FIG. 17 is a side view showing another embodiment of the second pickup apparatus for a magneto-optical recording medium in accordance with the present invention.
Figure 18:
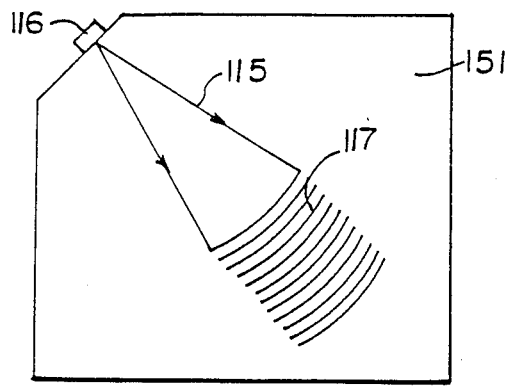
FIGS. 18 and 19 are plan views showing the first optical waveguide and the second optical waveguide in the embodiment shown in FIG. 17, FIGS. 20 and 21 are a side view and a plan view showing a further embodiment of the second pickup apparatus for a magneto-optical recording medium in accordance with the present invention.
Figure 19:
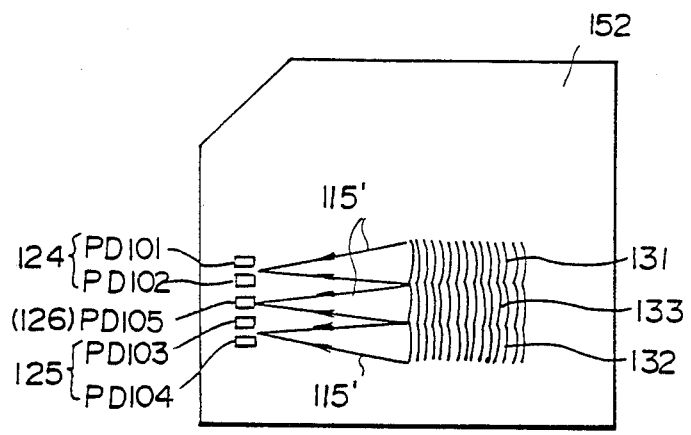

In the embodiment shown in FIG. 14, the first optical waveguide and the second optical waveguide are common to each other. Instead, in an embodiment shown in FIG. 17, the first optical waveguide and the second optical waveguide are formed independently of each other. Specifically, as shown in FIG. 17, a second optical waveguide 152 is provided on the support 123 via the buffer layer 128, and a first optical waveguide 151 is provided on the second optical waveguide 152 via a transparent buffer layer 150. Also, the first FGC 117 is formed on a surface 151a of the first optical waveguide 151, and the second FGC 131, the third FGC 132 and the fourth FGC 133 are formed on a surface 152a of the second optical waveguide 152. The first FGC 117 on one hand and the second FGC 131, the third FGC 132 and the fourth FGC 133 on the other hand are provided in overlapping relation to each other. As shown in FIGS. 18 and 19, the grating array direction of the first FGC 117 and the grating array direction of second FGC 131, the third FGC 132 and the fourth FGC 133 make an angle of 45° with respect to each other. The first optical waveguide 151 and the second optical waveguide 152 are disposed in such directions that the optical wave 115 radiated out of the first FGC 117 is regularly reflected by the reflection surface 114 of the magneto-optical disk 113.

In this case, a part of the optical wave 115 guided through the first optical waveguide 151 is diffracted by the first FGC 117 toward the support 123, is reflected by the boundary between the buffer layer 150 and the second optical waveguide 152 and by the boundary between the buffer layer 128 and the support 123, and advances upward toward the magneto-optical disk 113. In order to efficiently utilize the reflected part of the optical wave 115 and to prevent weakening of the optical wave 115 diffracted from the FGC 117 toward the magneto-optical disk 113, the thicknesses of the buffer layers 128 and 150 should preferably be selected so that the reflected part of the optical wave 115 and the optical wave 115 diffracted by the FGC 117 toward the magneto-optical disk 113 intensify each other by interference therebetween.

In the embodiment shown in FIG. 17, the optical wave 115' reflected by the magneto-optical disk 113 passes through the first FGC 117, the first optical waveguide 151 and the buffer layer 150, impinges upon the second FGC 131, the third FGC 132 and the fourth FGC 133, and is introduced by the second FGC 131, the third FGC 132 and the fourth FGC 133 into the second optical waveguide 152. Also with this configuration, the recorded signals, tracking error and focusing error can be detected by detecting the optical waves 15', 15', 15' converged inside of the second optical waveguide 152 by the first photodetector 124, the second photodetector 125 and the third photodetector 126 of the types as shown in FIG. 15, and processing the detection signals in the manner as mentioned above.

A further embodiment of the second pickup apparatus for a magneto-optical recording medium in accordance with the present invention will hereinbelow be described with reference to FIGS. 20 and 21. In this embodiment, as in the embodiment shown in FIG. 17, the first optical waveguide 151 and the second optical waveguide 152 are formed independently of each other, and are formed on the supports 153 and 123 independent of each other. The support 153 is transparent, and is secured to lie upon the second optical waveguide 152.

In this case, the first optical waveguide 151 and the second optical waveguide 152 are disposed so that the optical wave 115 radiated out of the FGC 117 is regularly reflected by the magneto-optical disk 113. Also, the relationship between the first FGC 117 on one hand and the second FGC 131, the third FGC 132 and the fourth FGC 133 on the other hand is the same as in the embodiment shown in FIG. 17, and the effects thereof are the same as in the embodiment shown in FIG. 17.

Figure 20:
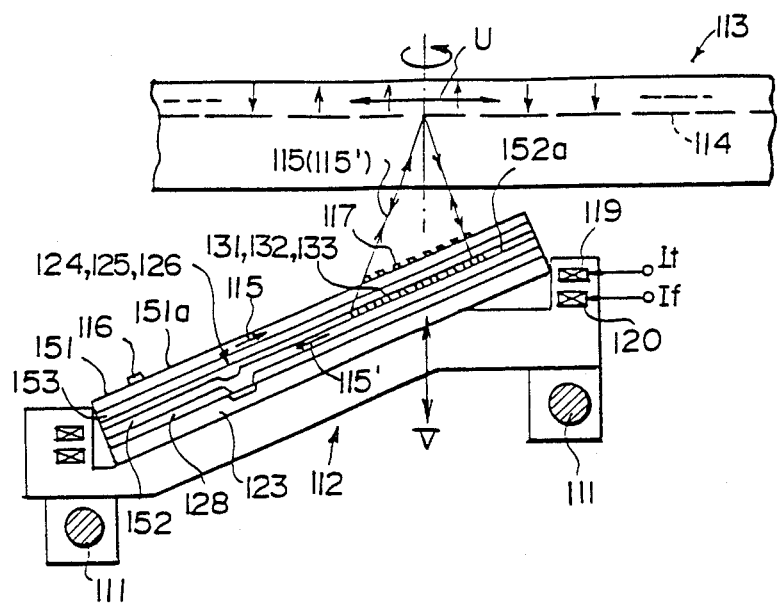
Figure 21:
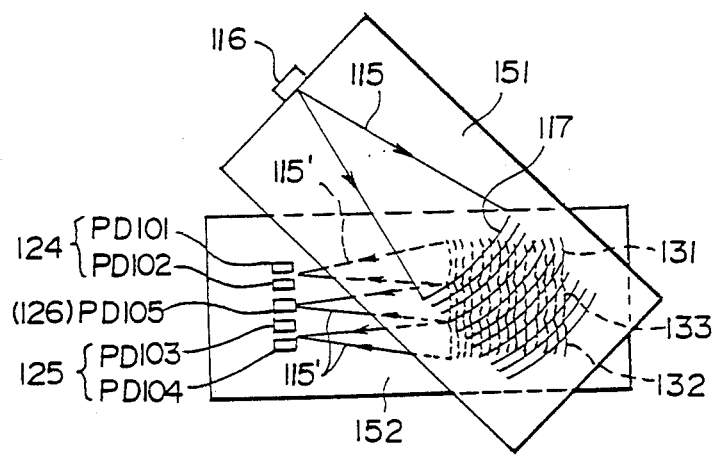

In the embodiments shown in FIGS. 17 and 20, the first optical waveguide 151 is disposed on the side near the magneto-optical disk 113, and the second optical waveguide 152 is disposed on the side remote from the magneto-optical disk 113. The relationship between the positions of the first optical waveguide 151 and the second optical waveguide 152 may be reversed.

In the embodiments shown in FIGS. 14, 17 and 20, the first photodetector 124, the second photodetector 125 and the third photodetector 126 are integrated on the surface 122a of the optical waveguide 122 or the surface 152a of the optical waveguide 152. The photodetectors 124, 125 and 126 may be provided on the optical waveguide 122 or the optical waveguide 152 in a different form. Specifically, when the case where a single optical waveguide is used is taken as an example, as shown in FIG. 22, the photodetectors 124, 125 and 126 may be disposed close to the surface 122a of the optical waveguide 122. In the case where the photodetectors 124, 125 and 126 are disposed close to the surface 122a of the optical waveguide 122 in this manner, a diffraction grating 180 for radiating the guided optical waves (reflected optical wave) 15', 15', 15' out of the optical waveguide 122 may be disposed on the surface 122a of the optical waveguide 122 as shown in FIG. 23, thereby to improve the light receiving efficiencies of the photodetectors 124, 125 and 126. Also, as shown in FIG. 24, an edge face 122c of the optical waveguide 122 may be polished, and the photodetectors 124, 125 and 126 may be secured in close contact with the edge face 122c. As shown in FIG. 25, each of the photodiodes PD101 to PD105 may be formed by, for example, stacking a lower transparent electrode 127a, a thin film-like photoconductive material 127b, and an upper electrode 127c in this order on the optical waveguide 122. In this case, an electric power source 127d is connected to apply a predetermined electric field between the lower transparent electrode 127a and the upper electrode 127c. With the photodiodes PD101 to PD105 having the configuration as mentioned above, when the photoconductive material 127b is exposed to light, a photocurrent of a level proportional to the amount of light flows through the photoconductive material 127b. Therefore, the optical amount which the photoconductive material 127b receives can be detected by detecting the change in potential at a terminal 127e. For constituting the thin film-like photoconductive material 127b, the same materials as mentioned above for the thin film-like photoconductive material 27b may be employed.

Besides the aforesaid method of making the FGC 131, the FGC 132 and the FGC 133, they can be formed by the planar technique by use of a known photolithographic method, a known holographic transfer method or the like, and can be easily mass-produced through duplication.

Embodiments of the third pickup apparatus for a magneto-optical recording medium in accordance with the present invention will be described hereinbelow with reference to FIGS. 26 to 29. In the second pickup apparatus for a magneto-optical recording medium in accordance with the present invention as mentioned above, the second focusing grating coupler, the third focusing grating coupler and the fourth focusing grating coupler are formed on the common optical waveguide. In the third pickup apparatus in accordance with the present invention, the second focusing grating coupler and the third foucsing grating coupler on one hand and the fourth focusing grating coupler on the other hand are formed on different optical waveguides and disposed in overlapping relation to each other.

Figure 26:
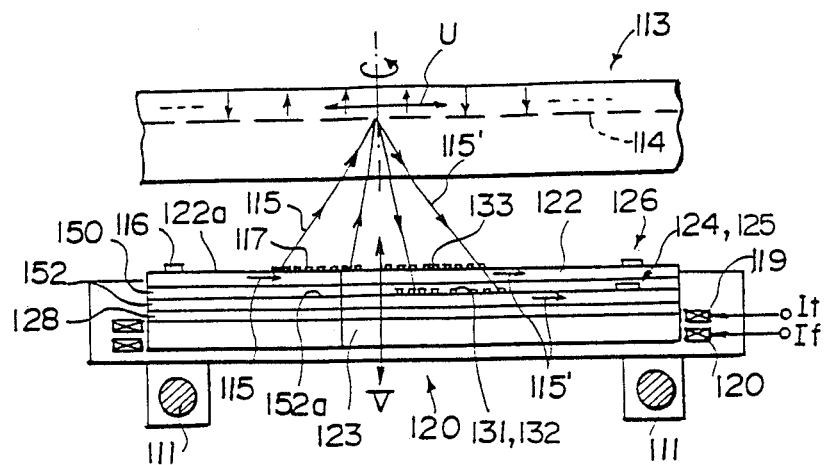
FIG. 26 is a side view showing an embodiment of the third pickup apparatus for a magneto-optical recording medium in accordance with the present invention.
Figure 27:
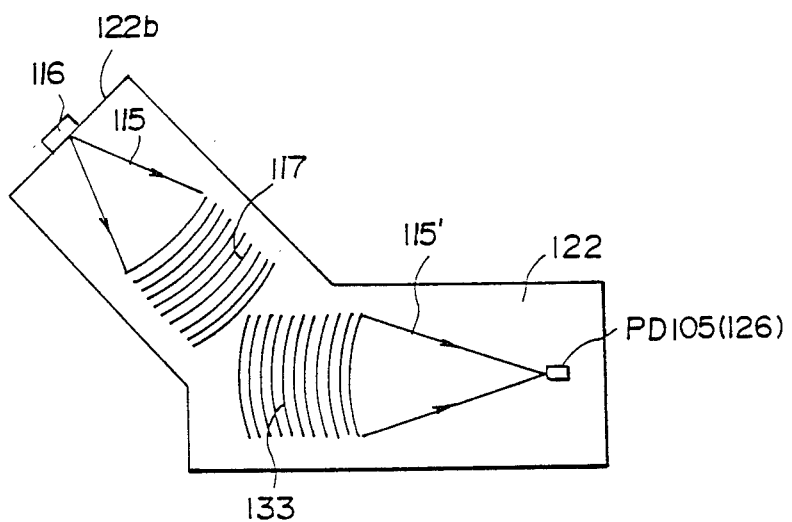
FIGS. 27 and 28 are plan views showing the first optical waveguide and the second optical waveguide in the embodiment shown in FIG. 26.
Figure 28:
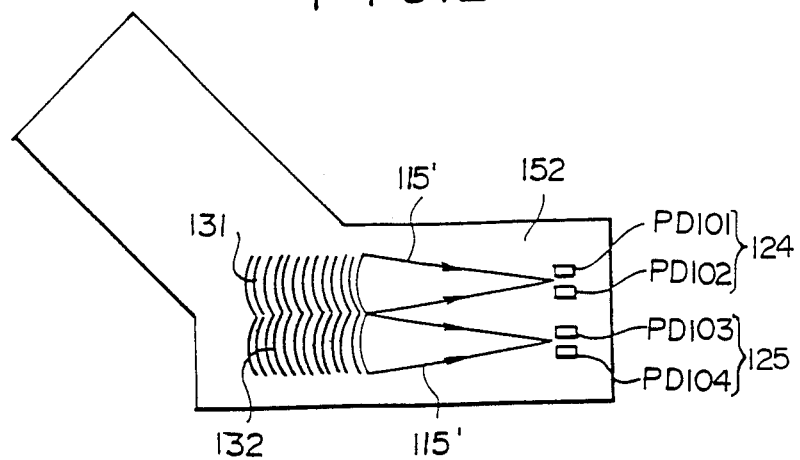

In an embodiment shown in FIG. 26, the first optical waveguide 122 is overlaid on the second optical waveguide 152 via the transparent buffer layer 150. The first FGC 117 for radiation of the optical wave and the fourth FGC 133 for entry of the reflected optical wave are formed on the surface 122a of the first optical waveguide 122. Specifically, in this embodiment, the first optical waveguide 122 is utilized also as the third optical waveguide on which the fourth FGC 133 is to be provided. On the other hand, the second FGC 131 and the third FGC 132 for entry of the reflected optical wave are formed on the surface 152a of the second optical waveguide 152. As shown in FIGS. 27 and 28, the fourth FGC 133 has an aperture area nearly equal to the total aperture area of the second FGC 131 and the third FGC 132, and is provided in overlapping relation to the second FGC 131 and the third FGC 132. Also, the first photodetector 124 and the second photodector 125 provided on the second optical waveguide 152 and the third photodetector 126 provided on the first optical waveguide 122 are of the same type as shown in FIG. 25.

In the other aspects, the embodiment shown in FIG. 26 is constituted in the same manner as the embodiment shown in FIGS. 14 and 15. With the embodiment shown in FIG. 26, the reflected optical wave 115' is introduced by the FGC 133 into the optical waveguide 122. Also, the reflected optical wave 115' passing through the optical waveguide 122 is introduced by the FGC 131 and the FGC 132 into the second optical waveguide 152. The reflected optical waves 115', 115' converged by the FGC 131 and the FGC 132 in the second optical waveguide 152 are detected respectively by the first photodetector 124 and the second photodetector 125. On the other hand, the reflected optical wave 115' converged by the FGC 133 in the first optical waveguide 122 is detected by the third photodetector 126. Accordingly, the recorded signals, tracking error and focusing error can be detected in the same manner as mentioned above.

Instead of constituting so that the first optical waveguide 122 acts also as the third optical waveguide, the first optical waveguide 122 (i.e. the optical waveguide on which the first FGC 117 is to be provided) may be constituted to act also as the second optical waveguide (on which the second FGC 131 and the third FGC 132 are to be provided), and the different third optical waveguide (on which the fourth FGC 133 is to be provided) may be disposed in overlapping relation to the optical waveguide 122.

Figure 29:
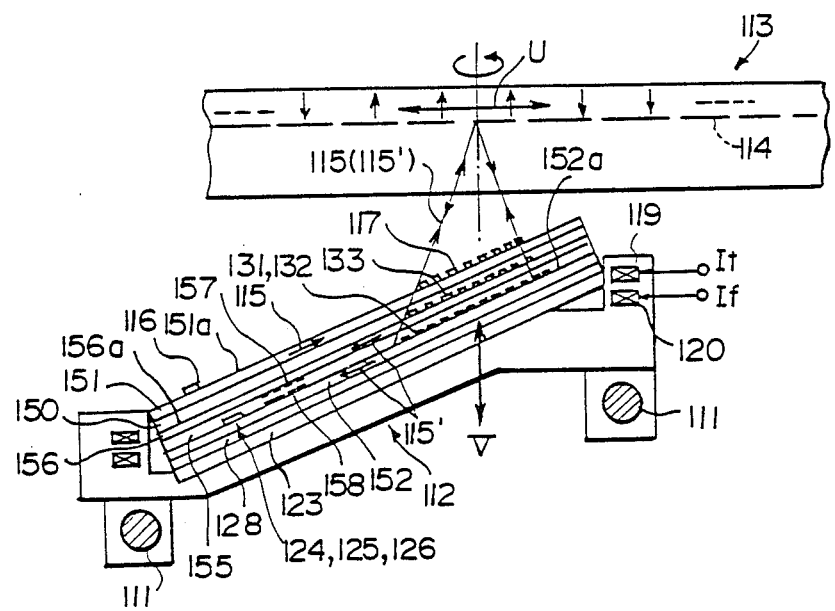
FIG. 29 is a side view showing another embodiment of the third pickup apparatus for a magneto-optical recording medium in accordance with the present invention.

In an embodiment shown in FIG. 29, a third optical waveguide 156 is provided on the second optical waveguide 152 via a transparent buffer layer 155, and the first optical waveguide 151 is provided on the third optical waveguide 156 via the transparent buffer layer 150. The relationship between the positions of the FGC 131, FGC 132 formed on the surface 152a of the second optical waveguide 152 and the position of the FGC 133 formed on a surface 156a of the third optical waveguide 156 is the same as in the embodiment shown in FIGS. 27 and 28. The FGC 131 and the FGC 132 on one hand and the FGC 133 on the other hand provided in overlapping relation to each other are disposed to overlap the first FGC 117.

In this embodiment, a linear grating coupler (LGC) 157 is provided on the surface of the third optical waveguide 156 on the side of the buffer layer 155. The LGC 157 radiates the optical wave 115', which is guided through the third optical waveguide 156 and converged, out of the third optical waveguide 156. On the other hand, an LGC 158 is provided on the surface of the second optical waveguide 152 on the side of the buffer layer 128 so that the LGC 158 faces the LGC 157. The guided optical wave 115' radiated by the LGC 157 out of the third optical waveguide 156 is introduced by the LGC 158 into the second optical waveguide 152. The third photodetector 126 is provided on the surface 152a of the second optical waveguide 152 together with the first photodetector 124 and the second photodetector 125, and detects the optical wave 115' entering from the third optical waveguide 156 to the second optical waveguide 152. By way of example, the photodetectors 124, 125, 126 are of the same type as shown in FIG. 25. In the other aspects, this embodiment is constituted in the same manner as the embodiment shown in FIG. 17.

The third photodetector 126 may be provided on the surface or the edge face of the third optical waveguide 156, and the LGC 157 and the LGC 158 may be omitted.

In the case where the first optical waveguide 151, the second optical waveguide 152 and the third optical waveguide 156 are provided independently of one another, the FGC 131 and the FGC 132 on one hand and the FGC 133 on the other hand provided in overlapping relation to each other may be disposed so that they do not overlap the first FGC 117. Also, the first optical waveguide 151, the second optical waveguide 152 and the third optical waveguide 156 may be formed on independent supports, and may then be laid one upon another. This also applies to the case where the third optical waveguide or the second optical waveguide is utilized in common with the first optical waveguide as shown in FIG. 26. The first optical waveguide 151, the second optical waveguide 152 and the third optical waveguide 156 may be laid one upon another in any sequence.

Figure 16:
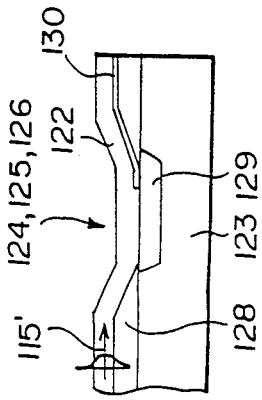
FIG. 16 is a side view showing the photodetector in the embodiment shown in FIG. 14.

In the third pickup apparatus for a magneto-optical recording medium in accordance with the present invention, various photodetectors as shown in FIGS. 16, 23 and 24 may be utilized.

In the case where the second FGC 131 and the third FGC 132 are disposed to overlap the fourth FGC 133, the polarized light component of the optical wave 115' that is not introduced by the FGC 133 (or the FGC 131 and the FGC 132) into the optical waveguide 156 (or the optical waveguide 152) can be introduced by the FGC 131 and the FGC 132 (or the FGC 133) into the optical waveguide 152) or the optical waveguide 156). Therefore, the light utilization efficiency becomes high.

We claim:

1. A pickup apparatus for a magneto-optical recording medium, which comprises:
   (i) a light source for irradiating a linearly polarized light beam onto a surface of a magneto-optical recording medium,
   (ii) an objective lens for converging said light beam onto the reflection surface of said magneto-optical recording medium,
   (iii) a first optical waveguide and a second optical waveguide combined integrally to overlap each other and disposed in such a direction that one surface of each of said first optical waveguide and said second optical waveguide receives the light beam reflected by said magneto-optical recording medium, (iv) a first focusing grating coupler and a second focusing grating coupler provided side by side at an incidence position of said reflected light beam on the surface of said first optical waveguide so that an axis passing through approximately the center of said reflected light beam and extending on said surface of said first optical waveguide approximately normal to a tracking direction intervenes between said first focusing grating coupler and said second focusing grating coupler, so that said first focusing grating coupler and said second focusing grating coupler respectively make said reflected light beam enter said first optical waveguide by exciting either one of a TE guided mode and a TM guided mode, and respectively converge the optical waves, which are thus guided through said first optical waveguide in the guided mode identical with each other, to positions spaced from each other with said axis intervening therebetween, (v) a third focusing grating coupler provided in overlapping relation to said first focusing grating coupler and said second focusing grating coupler at the incidence position of said reflected light beam on the surface of said second optical waveguide, so that said third focusing grating coupler makes said reflected light beam enter said second optical waveguide by exciting a guided mode different from said guided modes of said first focusing grating coupler and said second focusing grating coupler, and converges the optical wave, which is thus guided through said second optical waveguide, (vi) a first photodetector, a second photodetector, and a third photodetector mounted on the surface or an edge face of said first optical waveguide or said second optical waveguide for respectively detecting the optical wave converged by said first focusing grating coupler, the optical wave converged by said second focusing grating coupler, and the optical wave converged by said third focusing grating coupler, (vii) an error detection circuit for carrying out detection of tracking error and detection of focusing error on the basis of outputs of said first photodetector and said second photodetector, and (viii) a differential detection circuit for detecting signals recorded on said magneto-optical recording medium on the basis of a difference between the output of said first photodetector and/or the output of said second photodetector on one hand and an output of said third photodetector on the other hand.

2. An apparatus as defined in claim 1 wherein said first optical waveguide and said second optical waveguide are provided on a common support with a transparent buffer layer intervening between said first optical waveguide and said second optical waveguide.

3. An apparatus as defined in claim 1 wherein said first optical waveguide and said second optical waveguide are provided on different supports, and the support disposed between said first optical waveguide and said second optical waveguide is a transparent support.

4. An apparatus as defined in claim 1 wherein said first optical waveguide and said second optical waveguide are disposed so that a plane, on which said axis and a center axis of said reflected light beam lie, and the direction of polarization of said reflected light beam are inclined at an angle of approximately 45° with respect to each other.

5. An apparatus as defined in claim 1 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

6. An apparatus as defined in claim 1 wherein a support of said first optical waveguide and a support of said second optical waveguide are formed of a transparent member, and said first optical waveguide and said second optical waveguide are disposed between said light source and said objective lens.

7. An apparatus as defined in claim 1 wherein a buffer layer is disposed between said first optical waveguide or said second optical waveguide and a support of said optical waveguide, and said optical waveguide is disposed so that said light beam emitted by said light source is reflected by a boundary between said buffer layer and said support toward said magneto-optical recording medium.

8. An apparatus as defined in any of claims 1 to 7 wherein said first optical waveguide and said second optical waveguide on one hand and said objective lens on the other hand are disposed independently of each other, and said objective lens alone is moved for the purposes of tracking control and focusing control.

9. An apparatus as defined in any of claims 1 to 7 wherein said first optical waveguide and said second optical waveguide are disposed integrally with said objective lens and are moved together with said objective lens for the purposes of tracking control and focusing control.

10. An apparatus as defined in claim 1 wherein a grating for radiating the optical wave, which is guided through one of said first optical waveguide and said second optical waveguide, out of said optical waveguide and introducing said radiated optical wave into the other of said first optical waveguide and said second optical waveguide is provided on the surface of said first optical waveguide and on the surface of said second optical waveguide, and said first photodetector, said second photodetector and said third photodetector are mounted on the surface or the edge face of the other of said first optical waveguide and said second optical waveguide.

11. A pickup apparatus for a magneto-optical recording medium, which comprises:

(i) a first optical waveguide, (ii) a light source mounted on said first optical waveguide for emitting a linearly polarized light beam into said first optical waveguide, (iii) a first focusing grating coupler formed on a surface of said first optical waveguide for radiating the optical wave, which is thus guided through said first optical waveguide, out of said first optical waveguide, and converging said radiated optical wave on a reflection surface of a magneto-optical recording medium, (iv) a second optical waveguide combined integrally with said first optical waveguide and disposed in such a direction that one surface of said second optical waveguide receives the optical wave reflected by said magneto-optical recording medium, (v) a second focusing grating coupler and a third focusing grating coupler provided side by side at an incidence position of said reflected optical wave on the surface of said second optical waveguide so that an axis passing through approximately the center of said reflected optical wave and extending on said surface of said second optical waveguide approximately normal to a tracking direction intervenes between said second focusing grating coupler and said third focusing grating coupler, so that said second focusing grating coupler and said third focusing grating coupler respectively make said reflected optical wave enter said second optical waveguide by exciting either one of a TE guided mode and a TM guided mode, and respectively converge the optical waves, which are thus guided through said second optical waveguide in the guided modes identical with each other, to positions spaced from each other with said axis intervening therebetween, (vi) a fourth focusing grating coupler provided side by side with said second focusing grating coupler and said third focusing grating coupler at the incidence position of said reflected optical wave on the surface of said second optical waveguide, so that said fourth focusing grating coupler makes said reflected optical wave enter said second optical waveguide by exciting a guided mode different from said guided modes of said second focusing grating coupler and said third focusing grating coupler, and converges the optical wave, which is thus guided through said second optical waveguide, in said second optical waveguide, (vii) a first photodetector, a second photodetector, and a third photodetector mounted on the surface or an edge face of said second optical waveguide for respectively detecting the optical wave converged by said second focusing grating coupler, the optical wave converged by said third focusing grating coupler, and the optical wave converged by said fourth focusing grating coupler, (viii) an error detection circuit for carrying out detection of tracking error and detection of focusing error on the basis of outputs of said first photodetector and said second photodetector, and (ix) a differential detection circuit for detecting signals recorded on said magneto-optical recording medium on the basis of a difference between the output of said first photodetector and/or the output of said second photodetector on one hand and an output of said third photodetector on the other hand.

12. An apparatus as defined in claim 11 wherein said first optical waveguide and said second optical waveguide are common to each other, said common optical waveguide is disposed in such a direction that the optical wave radiated out of said first focusing grating coupler is not regularly reflected by said reflection surface, and said first focusing grating coupler on one hand and said second focusing grating coupler, said third focusing grating coupler and said fourth focusing grating coupler on the other hand do not overlap each other.

13. An apparatus as defined in claim 11 wherein said first optical waveguide and said second optical waveguide are formed independently of each other and combined integrally in overlapping relation to each other, said first optical waveguide and said second optical waveguide are disposed in such a direction that the optical wave radiated out of said first focusing grating coupler is regularly reflected by said reflection surface, and said first focusing grating coupler on one hand and said second focusing grating coupler, said third focusing grating coupler and said fourth focusing grating coupler on the other hand overlap each other.

14. An apparatus as defined in claim 13 wherein said first optical waveguide and said second optical waveguide are provided on a common support with a transparent buffer layer intervening between said first optical waveguide and said second optical waveguide.

15. An apparatus as defined in claim 13 wherein said first optical waveguide and said second optical waveguide are provided on different supports, and the support disposed between said first optical waveguide and said second optical waveguide is a transparent support.

16. An apparatus as defined in claim 11 wherein said light source is directly secured to the edge face of said first optical waveguide, and formed to introducing the light beam from said edge face into said first optical waveguide.

17. An apparatus as defined in claim 11 wherein said second optical waveguide is disposed so that a plane, on which said axis and a center axis of said reflected light beam lie, and the direction of polarization of said reflected light beam are inclined at an angle of approximately 45° with respect to each other.

18. An apparatus as defined in claim 11 wherein said fourth focusing grating coupler is positioned between said second focusing grating coupler and said third focusing grating coupler.

19. An apparatus as defined in claim 11 wherein said first photodetector and said second photodetector are respectively composed of two photodetectors divided from each other by a gap extending approximately in parallel with said axis so that detection of tracking error can be effected by a push-pull technique and detection of focusing error can be effected by a Foucault technique.

20. A pickup apparatus for a magneto-optical recording medium, which comprises:
(i) a first optical waveguide,
(ii) a light source mounted on said first optical waveguide for emitting a linearly polarized light beam into said first optical waveguide,
(iii) a first focusing grating coupler formed on a surface of said first optical waveguide for radiating the optical wave, which is thus guided through said first optical waveguide, out of said first optical waveguide, and converging said radiated optical wave on a reflection surface of a magneto-optical recording medium,
(iv) a second optical waveguide combined integrally with said first optical waveguide and disposed in such a direction that one surface of said second optical waveguide receives the optical wave reflected by said magneto-optical recording medium,
(v) a second focusing grating coupler and a third focusing grating coupler provided side by side at an incidence position of said reflected optical wave on the surface of said second optical waveguide so that an axis passing through approximately the center of said reflected optical wave and extending on said surface of said second optical waveguide approximately normal to a tracking direction intervenes between said second focusing grating coupler and said third focusing grating coupler, so that said second focusing grating coupler and said third focusing grating coupler respectively make said reflected optical wave enter said second optical waveguide by exciting either one of a TE guided mode and a TM guide mode, and respectively converge the optical waves, which are thus guided through said second optical waveguide in the guided modes identical with each other, to positions spaced from each other with said axis intervening therebetween, (vi) a third optical waveguide combined integrally with said second optical waveguide in overlapping relation thereto, (vii) a fourth focusing grating coupler provided in overlapping relation to said second focusing grating coupler and said third focusing grating coupler at the incidence position of said reflected optical wave on the surface of said third optical waveguide, so that said fourth focusing grating coupler makes said reflected optical wave enter said third optical waveguide by exciting a guided mode different from said guided modes of said second focusing grating coupler and said third focusing grating coupler, and converges the optical wave, which is thus guided through said third optical waveguide, in said third optical waveguide, (viii) a first photodetector, a second photodetector, and a third photodetector mounted on the surface or an edge face of said second optical waveguide or said third optical waveguide for respectively detecting the optical wave converged by said second focusing grating coupler, the optical wave converged by said third focusing grating coupler, and the optical wave converged by said fourth focusing grating coupler, (ix) an error detection circuit for carrying out detection of tracking error and detection of focusing error on the basis of outputs of said first photodetector and said second photodetector, and (x) a differential detection circuit for detecting signals recorded on said magneto-optical recording medium on the basis of a difference between the output of said first photodetector and/or the output of said second photodetector on one hand and an output of said third photodetector on the other hand.

21. An apparatus as defined in claim 20 wherein said second optical waveguide and said third optical waveguide are provided on a common support with a transparent buffer layer intervening between said second optical waveguide and said third optical waveguide.

22. An apparatus as defined in claim 20 wherein said second optical waveguide and said third optical waveguide are provided on different supports, and the support disposed between said second optical waveguide and said third optical waveguide is a transparent support.

* * * * *